United States Patent
Swain et al.

(10) Patent No.: US 7,534,296 B2
(45) Date of Patent: May 19, 2009

(54) ELECTRICALLY CONDUCTIVE DIAMOND ELECTRODES

(75) Inventors: Greg Swain, East Lansing, MI (US);
Anne Fischer, Arlington, VA (US);
Jason Bennett, Lansing, MI (US);
Michael Lowe, Holt, MI (US)

(73) Assignee: Board of Trustees of Michigan State University, East Lansing, MI (US)

( * ) Notice: Subject to any disclaimer, the term of this patent is extended or adjusted under 35 U.S.C. 154(b) by 162 days.

(21) Appl. No.: 11/378,109

(22) Filed: Mar. 17, 2006

(65) Prior Publication Data
US 2006/0175953 A1 Aug. 10, 2006

Related U.S. Application Data

(60) Continuation-in-part of application No. 11/110,083, filed on Apr. 20, 2005, now abandoned, which is a division of application No. 10/338,318, filed on Jan. 8, 2003, now Pat. No. 6,884,290.

(60) Provisional application No. 60/347,675, filed on Jan. 11, 2002.

(51) Int. Cl.
C30B 25/12 (2006.01)
C30B 15/14 (2006.01)
(52) U.S. Cl. .............. 117/68; 117/3; 117/89; 117/929; 423/446; 427/250; 427/577
(58) Field of Classification Search ........... 117/3, 117/68, 89, 929; 427/443, 250, 577; 423/446
See application file for complete search history.

(56) References Cited

U.S. PATENT DOCUMENTS

| | | | |
|---|---|---|---|
| 5,209,916 A | 5/1993 | Gruen | |
| 5,328,676 A | 7/1994 | Gruen | |
| 5,370,855 A | 12/1994 | Gruen | |
| 5,462,776 A | 10/1995 | Gruen | |
| 5,571,577 A | 11/1996 | Zhang et al. | |
| 5,620,512 A | 4/1997 | Gruen | |
| 5,645,645 A | 7/1997 | Zhang et al. | |
| 5,772,760 A | 6/1998 | Gruen et al. | |
| 5,849,079 A | 12/1998 | Gruen et al. | |
| 5,897,924 A | 4/1999 | Ulczynski et al. | |
| 5,900,127 A | 5/1999 | Iida et al. | |
| 5,902,640 A | 5/1999 | Krauss | |
| 5,989,511 A | 11/1999 | Gruen et al. | |
| 6,106,692 A | 8/2000 | Kunimatsu et al. | |

(Continued)

OTHER PUBLICATIONS

Fabrication and Evaluation of Platinum/Diamond Composite Electrocatalysis, Wand, et al, Journal of the Electrochemical Society (Jan. 2003), 150(1), E24-E32; ISSN:—13-4651.*

(Continued)

*Primary Examiner*—Felisa C Hiteshew
(74) *Attorney, Agent, or Firm*—Ian C. McLeod

(57) ABSTRACT

An electrically conductive diamond electrode and process for preparation thereof is described. The electrode comprises diamond particles coated with electrically conductive doped diamond preferably by chemical vapor deposition which are held together with a binder. The electrodes are useful for oxidation reduction in gas, such as hydrogen generation by electrolysis.

17 Claims, 14 Drawing Sheets

Preparation of Metal/DiamondComposite Elecrodes

◆ "Sandwich" growth method

U.S. PATENT DOCUMENTS

| | | | |
|---|---|---|---|
| 7,455,754 B2 * | 11/2008 | Wesner et al. | 204/294 |
| 2001/0001385 A1 | 5/2001 | Nakamura et al. | |
| 2003/0200914 A1 | 10/2003 | Noguchi et al. | |
| 2005/0016445 A1 | 1/2005 | Noguchi et al. | |
| 2005/0042161 A1 | 2/2005 | Carlisle et al. | |
| 2005/0109265 A1 | 5/2005 | Linares et al. | |

OTHER PUBLICATIONS

Preparation and Characterization of Boron-Doped Diamond Powder, Fischer, et al, Journal of the Electrochemical Society., vol. 152, Issue 9, pp. B369-B375 (Aug. 1, 2005).*
Wang, J., et al., J. New Mater. Electrochem. Syst. 3 75 (2000).
Wang, J., et al., Electrochem. Solid-State Lett., 3 286 (2000).
Auer, W., et al., Appl. Catal., A. 173 259 (1998).
Witek, M., et al., J. Wide Bandgap mater. vol. 8 No. 3-4 171-188 (Jan./Apr. 2001).
Xu, J., et al. Anal. Chem. 69, 591A (1997).
Swain, G.M., et al., MRS Bull., 23, 56 (1998).
Tenne, R., et al., Isr. J. Chem. 38 57 (1998).
Pleskov, Y.V., Russian Chemical Reviews68 381 (1999).
Vinokur, N., et al., J. Electrochem. Soc. 143 L238 (1996).
Rao, T.N., et al., Anal. Chem. 71 2506 (1999).
Roen, L.M., et al., Electrochem. Solid-State Lett. 7, A19 (2004).
Paik, C.H., et al., Electrochem. Solid-State Lett. 7, A82 (2004).
Kangasniemi, K.H., et al., J. Electrochem. Soc., 151 E125 (2004).
Wang, J., et al., Electrochem. Solid-State Lett., 5, E4 (2002).
Steele, B.C.H., et al., Nature (London), 414, 345 (2001).
Antolini, E., J. Mater, Sci., 38, 2995 (2003).
Swain, G.M., J. Electrochem. Soc., 141 3382 (1994).
Chen, Q., et al., J. Electrochem. Soc., 144 3806 (1997).
Show, Y., et al., Chem. Mater., 15 879 (2003).
Granger, M.C., et al., Anal. Chem. 72, 3793 (2000).
Dolmatov, V.Y., Russ. Chem. Rev. 70, 607 (2001).
Bergman, L., et al., J. Appl. Phys. 78 6709 (1995).
Mermoux, M., et al., J. Phys. Chem. B. 106, 10816 (2002).
Fagan, D.T., et al., Anal. Chem. 57 2759 (1985).
Fischer, A.E., et al., Anal. Chem. 76 2553 (2004).
Bennett, J.A., et al., J. Electrochem. Soc. 151 E306 (2004).
Kneten, K.R., et al., Anal. Chem. 64 2518 (1992).
Rice, R.J, et al., J. Am. Chem. Soc. 112 4617 (1989).
Chen, P., et al., Anal. Chem. 67 3115 (1995).
Gerischer, H., Electrochim.Acta, 35, 1677 (1990).
Hupert, M., et al., Diamond Relat. Mater., 12, 1940 (2003).
Granger, M.C., et al., J. Electrochem. Soc., 146, 4551 (1999).
Yagi, I., et al., J. Electroananl. Chem., 473, 173 (1999).
Cruickshank, B.J., et al., J. Electrochem. Soc., 139 2829 (1992).
Bowling, R., et al., Langmuir, 5, 683 (1989).
Goss, C.A., et al., Anal. Chem. 65 1378 (1993).

* cited by examiner

ELECTRICALLY CONDUCTIVE DIAMOND ELECTRODES

CROSS REFERENCE TO RELATED APPLICATION

This application is a continuation-in-part of application Ser. No. 11/110,083, filed Apr. 20, 2005 now abandoned, which is a division of application Ser. No. 10/338,318, filed Jan. 8, 2003, now U.S. Pat. No. 6,884,290 which claims priority to provisional application Ser. No. 60/347,675, filed Jan. 11, 2002.

GOVERNMENT RIGHTS

The research disclosed in this application was supported by the Department of Energy Grant No. DE-FG02-and FG03-01ER15120. The U.S. Government has certain rights to this invention.

BACKGROUND OF THE INVENTION

1. Field of the Invention

The present invention relates to a process for preparing an electrically conductive diamond electrode of diamond particles and a binder. The binder is preferably an organic binder. The present invention also relates to a particulate conductive diamond electrode with a particulate metal deposited on the diamond particles wherein the particles are bound together by a binder. In particular, the present invention relates to particulate platinum (Pt) or ruthenium (Ru) or rhodium (Rh) and noble metal alloys thereof based diamond film electrodes. The diamond electrode can be used in fuel cells, electrosynthesis or electrochemical-based chemical contaminant remediation.

2. Description of Related Art

The present invention uses a deposition process similar to that described by Gruen et al. See for example U.S. Pat. Nos. 5,989,511; 5,849,079 and 5,772,760. The patents to Gruen et al. describe processes for synthesizing relatively smooth polycrystalline diamond films starting with the mixing of carbonaceous vapors, such as methane or acetylene gas, with a gas stream consisting of mostly an inert or noble gas, such as argon, with, if necessary, also small fractional (1-3%) additions of hydrogen gas. This gas is then activated in, for example, in a microwave plasma environment, and under the appropriate conditions of pressure, gas flow, microwave power, substrate temperature and reactor configuration, nanocrystalline diamond films are deposited on a substrate.

Other related patents relating to diamond deposition are U.S. Pat. Nos. 5,209,916 to Gruen; 5,328,676 to Gruen; 5,370,855 to Gruen; 5,462,776 to Gruen; 5,620,512 to Gruen; 5,571,577 to Zhang et al; 5,645,645 to Zhang et al; 5,897,924 to Ulczynski et al and 5,902,640 to Krauss, as well as numerous patents to Asmussen which are all incorporated by reference herein.

U.S. Pat. Nos. 6,106,692 to Kunimatsu et al; and 5,900,127 to Iida et al describe conductive diamond electrodes. G. M. Swain (Wang, J., et al., *J. New Mater. Electrochem. Syst.* 3 75 (2000) and Wang, J., et al., *Electrochem. Solid-State Lett.*, 3 286 (2000)) describe electrodes with embedded platinum particles produced by magnetron sputtering.

Electrodes consisting of supported metal catalysts are used in a number of industrial processes (e.g., electrosynthesis) and electrochemical energy conversion devices (e.g., fuel cells). The metal catalysts are typically impregnated into the porous structure of several types of $sp^2$ bonded carbon materials; chemically or physically activated carbon, carbon black, and graphitized carbons.[1] Activated carbon is the most common type of support, at least in part because of the material's chemical stability in acidic and alkaline environments. The primary role of the support is to finely disperse and stabilize small metallic particles, and thus provide access to a much larger number of catalytically active atoms than in the bulk metal even when the latter is ground into a fine powder (Auer, W., et al., *Appl. Catal., A*, 173 259 (1998)). Several properties of the support are important; among them porosity, pore size distribution, crush strength, surface chemistry, and microstructural and morphological stability.

The present invention uses electrically conducting diamond thin films (Wang, J., et al., *J. New Mater. Electrochem. Syst.*, 3 75 (2000); Wang, J., et al., *Electrochem. Solid-State Lett.*, 3, 286 (2000); and Witek, M., et al., *J. Wide Bandgap Mater. Vol.* 8 No. 3-4 171-188 (Jan/Apr 2001)). The use of electrically conducting microcrystalline and nanocrystalline diamond electrodes in electrochemistry is a relatively new field of research (Xu, J., et al., *Anal. Chem.* 69, 591A (1997); Swain, G. M., et al., *MRS Bull.*, 23, 56 (1998); Tenne, R., et al., *Isr. J. Chem.* 38 57 (1998); Pleskov, Y. V., *Russian Chemical Reviews* 68 381 (1999); Vinokur, N., et al., *J. Electrochem. Soc.* 143 L238 (1996); and Rao, T. N., et al., *Anal. Chem.* 71 2506 (1999)). The properties of this new electrode material make it ideally suited for electrochemical applications, particularly demanding ones (i.e., complex matrix, high current density, and potential, high temperature, extremes in pH, and the like). Recent work has shown that nanometer-sized dispersions of Pt can be incorporated and anchored into the surface microstructure of boron-doped microcrystalline diamond thin film electrodes (Wang, J., et al., *J. New Mater. Electrochem. Syst.*, 3, 75 (2000); Wang, J., et al., *Electrochem. Solid-State Lett.*, 3 286 (2000); and Witek, M., et al., *J. Wide Bandgap Mater. Vol.* 8 No. 3-4 171-188 (Jan/Apr 2001)). The diamond film serves as a host for the catalyst particles providing electrical conductivity (est. ,0.1 Ω cm), thermal conductivity, and dimensional stability. The microstructure and morphology of the diamond, as well as the electrocatalytic activity of the Pt particles, were observed to be very stable during extended electrolysis as no degradation of either was detected after 2000 potential cycles between the hydrogen and oxygen evolution regimes in 0.1 M $HClO_4$ at room temperature (1-6 $mA/cm^2$) (Wang, J., et al., *Electrochem. Solid-State Lett.*, 3 286 (2000)). Importantly, the metal catalyst exposed at the surface is in electronic communication with the current collecting substrate through the boron-doped diamond film, and is electroactive for the underpotential deposition of hydrogen (Wang, J., et al., *J. New Mater. Electrochem. Syst.*, 3, 75 (2000); Wang, J., et al., *Electrochem. Solid-State Lett.*, 3 286 (2000); and Witek, M., et al., *J. Wide Bandgap Mater. Vol.* 8 No. 3-4 171-188 (Jan/Apr 2001)), the reduction of oxygen, and the oxidation of methanol (Wang, J., et al., *J. New Mater. Electrochem. Syst.*, 3 75 (2000); and Wang, J., et al., *Electrochem. Solid-State Lett.*, 3 286 (2000))

Other art related to forming and/or doping of diamond is described in U.S. Pat. Nos. 2005/0016445 A1 and 2003/0200914A1 to Noguchi et al; 2001/0001385A1 to Nakamura et al; 2005/0042161 A1 to Carlisle et al; 2005/0109265 A1 to Linares et al, all of which are incorporated by reference herein.

Polymer electrolyte membrane fuel cells (PEMFCS) are a promising energy technology, particularly for transportation applications (Roen, L. M., et al., *Electrochem. Solid-State Lett.* 7, A19 (2004)). Membrane electrode assemblies are used in such fuel cells. Electrocatalytic metal particles supported on carbon are used as the cathode and anode in MEAs.

The long-term stability of the MEAs is a concern due to the degradation of components in either oxidizing or reducing environments accompanied with electrode potentials induced by the cell reaction (Roen, L. M., et al., *Electrochem. Solid-State Lett.* 7, A19 (2004); Paik, C. H., et al., *Electrochem. Solid-state Lett.* 7, A82 (2004); and Kangasniemi, K. H., et al., *J. Electrochem. Soc.*, 151 E125 (2004)). Typical $sp^2$-bonded carbon support materials, such as activated carbon, carbon black, and graphitized carbons, have high electrical conductivity and surface area but are susceptible to microstructural and morphological degradation under oxidizing conditions (Auer, E., et al., *Appl. Catal. A*, 173, 259 (1998); and Steele, B.C.H., et al., Nature (London), 414, 345 (2001)). For example, degradation of the cathode in fuel cells occurs via oxidation reactions that alter the surface chemistry and microstructure. Ultimately, the oxidation can cause corrosion via carbon gasification reactions. Degradation of the electrocatalyst support is a problem because it leads to loss of electrocatalyst activity, increased ohmic resistance, and reduced operational efficiency of PEMFCs (Roen, L. M., et al., *Electrochem. Solid-State Lett.* 7, A19 (2004); Paik, C. H., et al., *Electrochem. Solid-state Lett.* 7, A82 (2004); and Kangasniemi, K. H., et al., *J. Electrochem. Soc.*, 151 E125 (2004); Antolini, E., *J. Mater. Sci.*, 38, 2995 (2003); and Appleby, A. J., *Corrosion* (Houston), 43, 398 (1987)).

Given the corrosion susceptibility of conventional carbon support materials, there is a technological need for advanced support materials that are morphologically and microstructurally stable during exposure to aggressive chemical and electrochemical environments.

OBJECTS

It is therefore an object of the present invention to provide a novel process and diamond electrode produced thereby. These and other objects will become increasingly apparent by reference to the following description.

SUMMARY OF THE INVENTION

Figure 1:
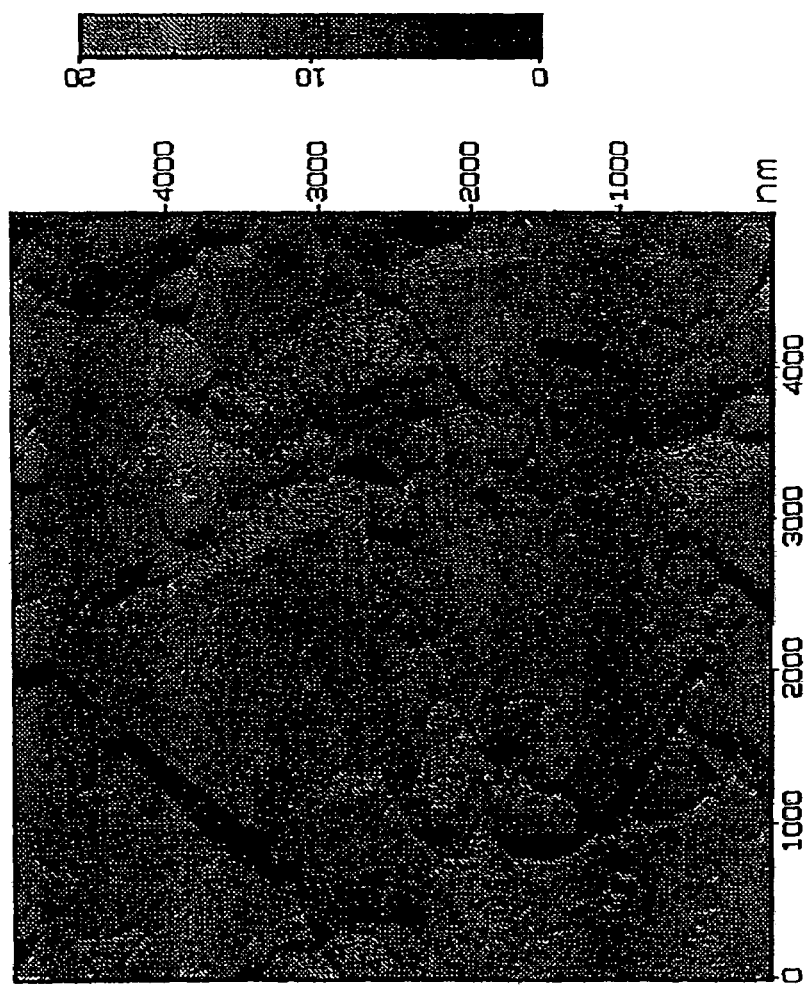
FIG. 1 are AFM images showing 10 to 500 nm diameter (spherical) Pt particles incorporated into the diamond surface microstructure with smaller diamond particles on the triangular diamond microcrystallite surfaces and larger particles in the grain boundaries between the microcrystallites.

The present invention relates to a process for the production of an electrically conductive diamond electrode which comprises:

coating diamond particles with electrically conductive doped diamond to provide doped diamond particles comprising the diamond particles coated with the doped diamond; and binding diamond doped particles with a binder so that the doped diamond particles are in electrical connection with each other to provide the diamond electrode. Preferably a portion of the doped diamond particles are exposed on at least one surface of the diamond electrode. Preferably individual of the doped diamond particles are in contact with each other in the binder so as to be conductive. Preferably the binder is electrically conductive along with the doped diamond particles. Preferably the doped diamond crystals are coated with conductive metal particles. Preferably the doped diamond crystals are coated with platinum metal particles. Preferably the doped diamond crystals are coated with conductive metal particles by electrodeposition. Preferably the doped diamond is doped with boron so as to be conductive. Preferably the doped diamond particles are coated with conductive metal particles and wherein the doped diamond crystals with the metal particles are coated with a film of chemical vapor deposited diamond to secure the metal particles on the doped diamond crystals. Preferably the chemical vapor deposition is accomplished by microwave assisted activation of deposition gases comprising an organic carbon source and hydrogen at reduced pressures.

The present invention also relates to an electrically conductive diamond electrode which comprises:

diamond particles coated with electrically conductive doped diamond so as to provide doped diamond particles comprising the diamond crystals coated with the doped diamond; and an organic polymer as a binder for the doped diamond particles so that the doped diamond particles are in electrical contact with each other to provide the conductive diamond electrode. Preferably the doped diamond is boron doped diamond. Preferably the binder is a fluorinated organic polymer. Preferably the doped diamond particles are coated with conductive metal particles. Preferably the doped diamond particles are in contact with each other. Preferably the binder is electrically conductive.

The present invention also relates to a process which comprises:

coating synthetic diamond particles so as to be electrically conductive with a layer of boron-doped diamond by chemical vapor deposition; and binding the resulting boron-doped diamond particles together with an organic polymer so that the electrically conducting diamond particles are in direct contact with one another forming an electrode. Preferably the diamond powders are either fully or partially overcoated with the electrically conducting diamond layer. Preferably individual electrically conducting diamond particles are in contact with one another and held together by the organic polymer which is electrically conducting so as to form the electrode. Preferably the electrically conducting diamond particles are coated with small particles of an electrocatalytic metal.

The binder for the present invention can be ceramic or metal or a polymer. Organic polymers such as poly(tetrafluoroethylene) are preferred.

The present invention relates to a process for the production of a diamond electrode which comprises: providing a first diamond support, doped with at least one element so as to be electrically conductive; electrodepositing particles of a conductive metal as a coating on the diamond support; and depositing a diamond film on the diamond support and around the particles of the conductive metal to surround and anchor the particles and to produce the diamond electrode wherein the particles are conductive through the support.

The present invention relates to a process for the production of a diamond electrode which comprises:

providing a first diamond film, doped with at least one element, such as boron, so as to be electrically conductive, on an electrically conductive substrate;

electrodepositing particles of a conductive metal, such as platinum, as a coating on the diamond film; and depositing a second diamond film on the first diamond film and around the particles of the conductive metal for the purpose of surrounding the metal particles to anchor the particles and to produce the diamond electrode wherein the metal particles are in good electrical communication with the conductive substrate through the electrically conducting diamond film. It was unexpected that the electrolytically deposited particles of the metal would be anchored securely by this method. A representative diamond film is shown in FIG. 1.

The present invention also relates to a diamond electrode which comprises:

a first polycrystalline diamond support, doped with at least one element so as to be electrically conductive;

particles of a conductive metal which have been electrodeposited as a coating on the diamond support; and a polycrystalline diamond film deposited on the diamond support and around the particles of the conductive metal to surround and anchor the particles to thereby provide the conductive electrode.

The present invention also relates to a diamond electrode which comprises:

a first polycrystalline diamond film doped with at least one element so as to be electrically conductive;

particles of a conductive metal which have been electrodeposited as a coating on the first diamond film; and a second polycrystalline diamond film deposited on the first diamond film and around the particles of the conductive metal to surround and anchor the particles to thereby provide the conductive electrode.

The "electrically conductive substrate" can have any shape (such as planar or curved) and be in the form of a low surface area planar substrate or a high surface area substrate as a mesh, foam or particle substrate. The substrate can also be a composite of multiple electrically conductive substrate.

The electrically conductive diamond can be a composite of various layers or forms of diamond alone (such as nanocrystalline or single crystal diamond) or with carbon in different forms. All of these forms of diamond (including diamond-like carbons) are well known to those skilled in the art.

Preferably the particles of metal are platinum. Also preferably the doping element is boron. The diamond films are preferably deposited by chemical vapor deposition. The chemical vapor deposition is preferably accomplished by microwave activation in the presence of methane and hydrogen at reduced pressures. Preferably electrodeposition is of a metal halide salt which is reduced to the metal. Preferably the conductive metal particles are irregularly spherical in shape. Most preferably the electrodeposition is from a platinum halide salt in the presence of perchloric acid.

The preparation of boron doped diamond is described in detail in U.S. application Ser. No. 10/991,272, filed Nov. 17, 2004. This application is incorporated by reference herein in its entirety.

Thus the objective of this invention is a new electrocatalytic electrode with extreme microstructural and morphological stability to be used for electrosynthesis, electrochemical-based toxic waste remediation and energy conversion devices. This dimensional stability allows the electrode to be stably operated under extreme conditions (e.g., acidic or caustic solutions, high current density ($>0.1$ A/cm$^2$) and high temperature ($>150°$ C.)). The platform for the invention is an electrically conducting diamond thin film in which nanometer-sized particles of Pt have been incorporated. The dispersed metal particles are incorporated into the surface microstructure of the diamond and exposed such that the electrodes are active for the generation of hydrogen gas, the reduction of oxygen gas and the oxidation of methanol. The preferred embodiment is referred to as a Pt/diamond composite electrode. An atomic force microscope image of the composite electrode is shown in FIG. 1.

Electrodes consisting of supported metal catalysts are used in a number of industrial processes (e.g., electrosynthesis) and electrochemical energy conversion devices (e.g., fuel cells). The metal catalysts are typically impregnated into the porous structure of several types of sp$^2$ bonded carbon materials: chemically or physically activated carbon, carbon black and graphitized carbons. The advantage of the Pt/diamond composite electrode is the extreme dimensional stability of the diamond host/support. The composite electrode can operate stably under harsh electrochemical conditions, such as extremes in solution pH, high temperature and high current density; conditions under which commercial sp$^2$ carbon supports fail catastrophically. The metal catalyst particles are physically anchored within the diamond such that they do not agglomerate or come detached during high density electrolysis (0.1 A/cm$^2$).

Several markets benefit from this invention, in particular, companies manufacturing electrolyzers to generate chlorine or ozone, and reactors to electrochemically remediate toxic waste. Companies marketing dimensionally stable electrodes for electrosynthesis could also benefit from this technology. Finally, companies manufacturing and marketing small-scale fuel cells would be interested in this technology.

Figure 2:
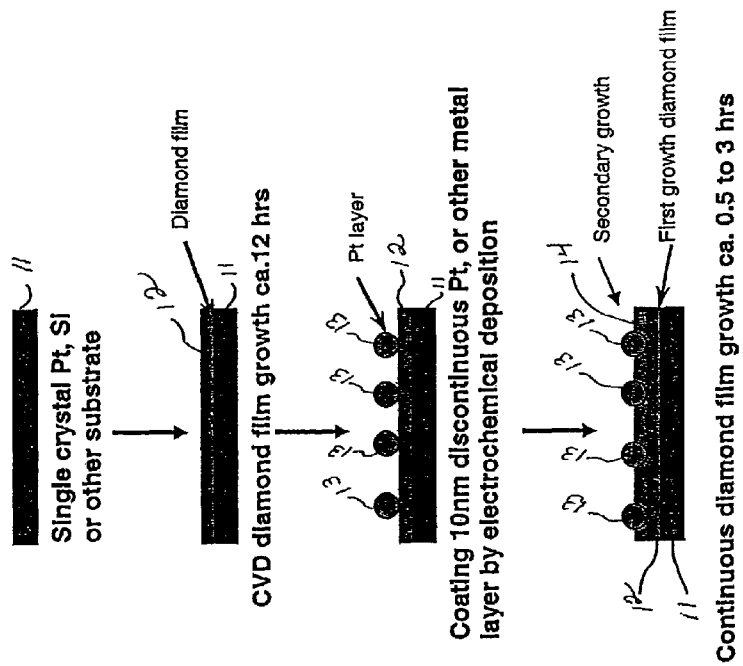
FIG. 2 is a schematic diagram showing the steps in the process to form the diamond electrode containing particles of platinum anchored by diamond particles.
Figure 2A:
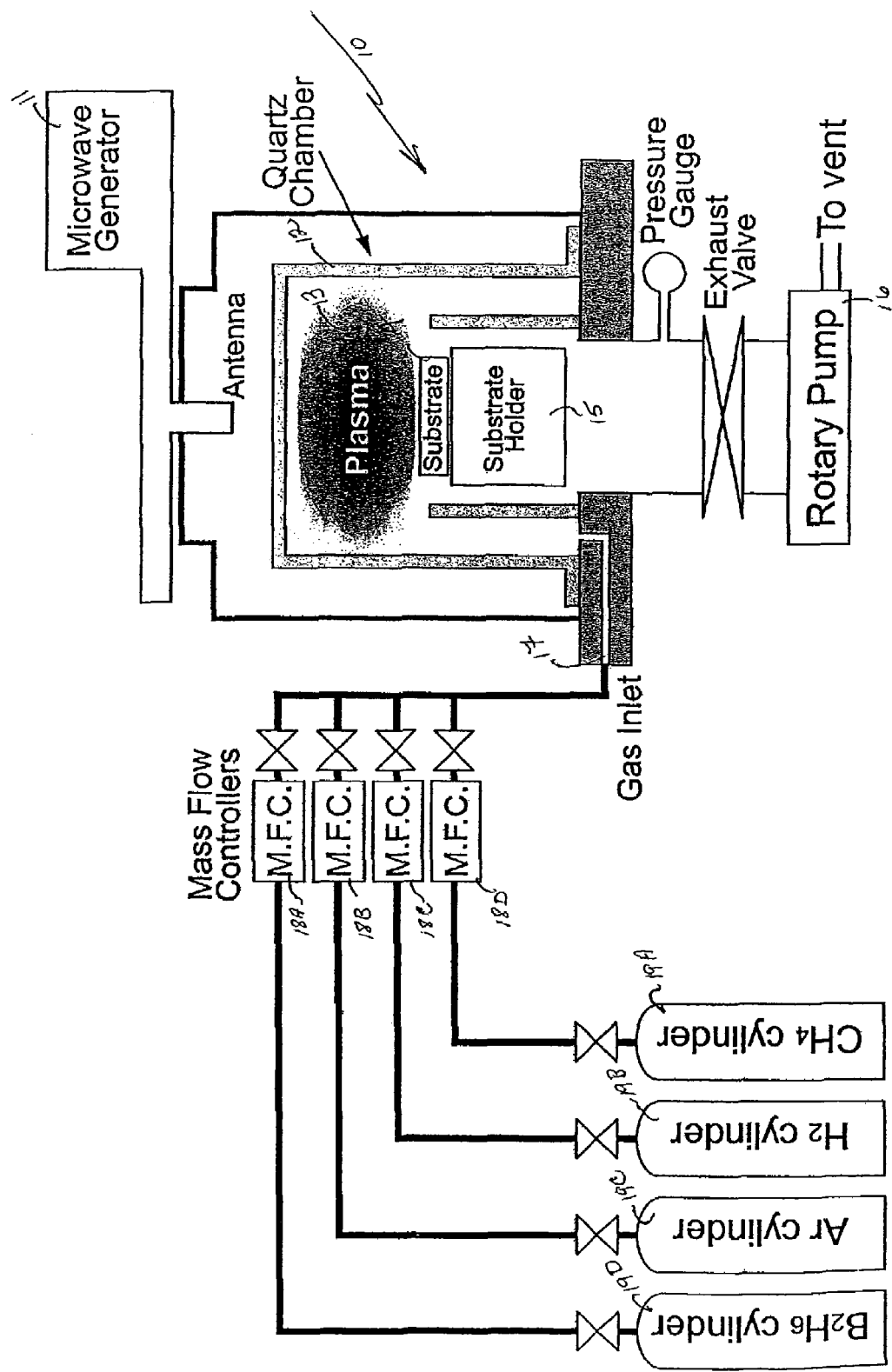
FIG. 2A is a schematic diagram of the apparatus 10 used in the process of FIG. 2. In a particular example, $C_M$ (methane) was 0.3%, P was 60 torr, $T_s$ (stage) was 875° C., and B/C was ~0.1% by atomic concentration.

The composite electrodes are fabricated by a multistep process that is illustrated in the second attached FIG. 2. A boron doped first diamond film 12 is grown on a P—Si or platinum substrate 11. Platinum (Pt) is electrolytically deposited on the film 12 as irregular microspheres. A second boron doped diamond film 14 is then grown around the Pt to anchor the Pt on the first film 12. FIG. 2A shows a side view of a microwave CVD reactor 10. In FIG. 2A the following elements are present:

10—reactor
11—microwave generator and antenna
12—quartz chamber
13—plasma
14—substrate
15—substrate holder
16—vacuum pump
17—gas inlet
18A to 18D—mass flow controllers
19A to 19D—gas cylinders Such a reactor 10 is well known to those skilled in the art.

Working forms of the Pt/diamond composite electrodes were fabricated. The electrodes fabricated all used electrically conducting silicon substrates. The diamond particle size ranges from 30 to 300 nm with a particle distribution of about 2.5×10$^8$/cm$^2$. The electrode response toward hydrogen evolution, oxygen reduction and methanol oxidation was evaluated, as were several aspects of the dimensional stability during exposure to harsh electrochemical conditions and found to be satisfactory.

The nominal diamond particle size is preferably between 10 and 50 nm. The present invention contemplates fabricating the composite electrodes in a cost effective manner, and advancing the technology so as to coat high surface area metal mesh supports. Finally, the incorporation of Pt/Ru and Pt/Os metal alloy particles can be accomplished.

In summary, dimensionally stable Pt/diamond composite electrodes have been developed for use in electrosynthesis, electrochemical-based toxic waste remediation and energy conversion devices. The dimensionally stable and corrosion resistant electrodes consist of well-faceted microcrystallites with dispersed Pt particles incorporated into the surface region. The metal particles are well anchored and range from 30 to 300 nm with a distribution of about 2.5×10$^8$/cm$^2$. Importantly, the Pt particles at the surface are in communication with the current collecting substrate through the boron-doped diamond matrix, and they are electroactive for the underpotential deposition of hydrogen, the reduction of oxygen and the oxidation of methanol. The dispersed Pt particles are extremely stable as no loss in activity is observed after 2000 potential cycles between the hydrogen and oxygen evolution regimes in 0.1 M HClO$_4$ (1-6 mA/cm$^2$). The composite electrode is also extremely stable during anodic polarization in 85% H$_3$PO$_4$ at 170° C. and 0.1 A/cm$^2$. The composite electrodes exhibit no evidence of any morphological or microstructural damage, and more importantly, no evidence of any catalyst activity loss for hydrogen evolution or oxygen reduction during exposure to the extreme conditions.

The diamond films are conductive because they are doped with a conductive element (such as boron). The diamond is doped at a level of 0.1% by atomic concentration (B/C) or higher, where p-Si is used as a substrate rather than platinum, then the p-Si is doped at a level of about 0.05 to 0.1% by atomic concentration boron.

The metal particles are preferably comprised of a metal in Group VIIIB. Particularly preferred are Pt, Rh and/or Ru and alloys thereof. The metal particles are generally irregularly spherical in shape since the metal particles are formed by an isolated nucleation and growth mechanism. Obviously the particles have irregular spherical shapes.

DESCRIPTION OF PREFERRED EMBODIMENTS

The morphological and microstructural stability, as well as the catalytic activity of a Pt/diamond composite electrode during two 1 h periods of anodic polarization in 85% H$_3$PO$_4$ at 170° C. and 0.1 A/cm$^2$, were investigated. The composite electrode consisted of an electrically conducting diamond thin film support with Pt metal particles entrapped in the surface microstructure by diamond particles. The Pt particles range in diameter from 30 to 300 nm with a distribution of about 2×10$^8$ cm$^{-2}$. No evidence of morphological of microstructural damage, and, more importantly, no loss of catalyst activity for hydrogen evolution or oxygen reduction was observed after the harsh electrolysis. A Pt-impregnated sp$^2$ carbon cloth electrode was observed to catastrophically fail during the first hour of electrolysis.

A stability test was conducted of the Pt/diamond composite electrode more demanding than any which has been published (Swain, G. M., *J. Electrochem. Soc.*, 141 3382 (1994); and Chen, Q., et al., *J. Electrochem. Soc.*, 144 3806 (1997)), exposure to 85% phosphoric acid at 170° C. for 2 h at an anodic current density of 0.1 A/cm$^2$. The electrode morphology and microstructure were evaluated before and after the electrolysis using optical microscopy, atomic force microscopy (AFM), and Raman spectroscopy. The electrocatalytic activity of the metal catalyst was examined before and after using cyclic voltammetry (CV) in 0.1 M HCLO$_4$ A commercial Pt-impregnated sp$^2$ carbon cloth electrode having a loading of 0.5 mg/cm$^2$ and a nominal catalyst size of 2 nm was exposed to the same electrolysis conditions. The purpose for this was to compare the performance of the Pt/diamond composite electrode with that of a "real world," sp$^2$ carbon-supported catalytic electrode.

EXAMPLE 1

Experimental

The boron-doped diamond thin films were deposited on p-Si (100) substrates (<0.01 Ω cm) using microwave-assisted chemical vapor deposition (CVD) (1.5 kW, 2.54 GHz, Astex, Inc., Lowell, Mass.). Details of the deposition procedure have been presented elsewhere (Wang, J., et al., *J. New Mater. Electrochem. Syst.*, 3 75 (2000); and Wang, J., et al., *Electrochem. Solid-state Lett.*, 3 286 (2000)). The composite electrodes were prepared by initially depositing a ca. 3 μm thick boron-doped film for 12 h using a CH$_4$/H$_2$ volumetric ratio of 0.35%. The microwave power was 1000 W, the pressure was ca. 40 to 60 Torr and the substrate temperature was ca. 875° C. The diamond growth was then stopped and the substrates cooled to less than 300° C. in the presence of atomic hydrogen. After cooling to room temperature, the film-coated substrates were removed from the reactor and a discontinuous layer of Pt particles was electrodeposited. The metal was electrodeposited from 1 mM $K_2PtCl_6$+0.1 M $HClO_4$ using a constant current of 100 µA (500 µA/cm$^2$) and a variable deposition time from 100 to 500 s. The Pt-coated films were then placed back in the CVD reactor and boron-doped diamond was deposited for an additional 3 h using the same conditions as described above. This second deposition results in diamond film growth around the metal particles securely anchoring them into the surface microstructure. The final Pt particles range in diameter from 30 to 300 nm with a distribution of about $2\times10^8$ cm$^{-2}$. These particles are larger than desired for a catalytic electrode (~5 nm diam optimum). The control of the metal particle size to less than 50 nm is easily within the skill of the art.

The film morphology was investigated with AFM using a Nanoscope II instrument (Digital Instruments, Santa Barbara, Calif.) operated in the contact mode. Pyramidal-shaped $Si_3N_4$ tips mounted on gold cantilevers (100 µm legs, 0.38 N/m spring constant) were used to acquire topographical images in air.

The film microstructure was assessed with Raman spectroscopy. The spectra were obtained at room temperature with a Chromex 2000 spectrometer (Chromex, Inc., Albuquerque, N.Mex.) using laser excitation at 532 nm, a monochromator slit width of 5 µm, and integration time of 10 S. The spectrometer was equipped with a 1026×200 element charge-coupled device (CCD) detector. A white light spectrum was collected under the same conditions and used to ratio the spectra. The laser power at the sample was ca. 30 mW, as measured with a thermopile detector.

Figure 7:
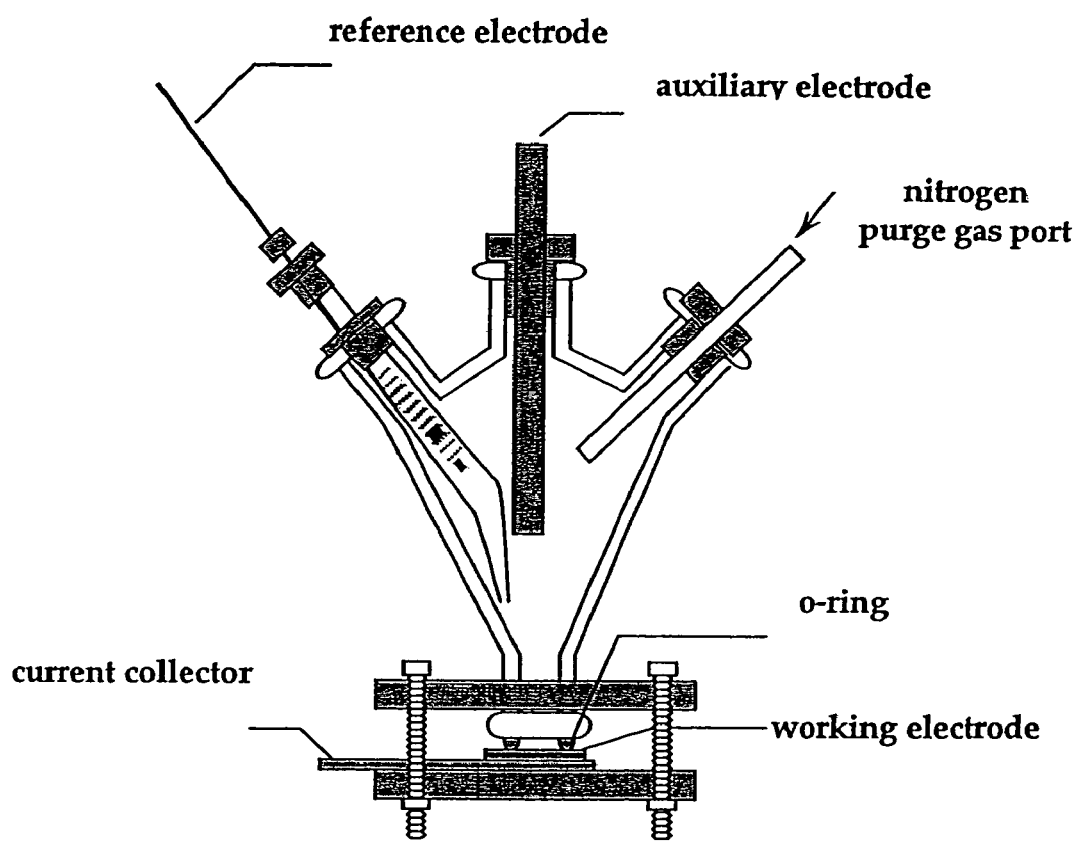
FIG. 7 is a schematic front view of the cell used in the example.

The anodic polarization was performed in 85% $H_3PO_4$ (ultrapure grade, Aldrich Chemical) at 170° C. A partially sealed single compartment, three-electrode cell, as shown in FIG. 7, was placed inside an oven to regulate the temperature. The entire oven was placed inside a fume hood to exhaust any released acid vapors. An anodic current density of 0.1 A/cm$^2$ was applied for two 1 h periods. The same anodic polarization was performed using a Pt-impregnated commercial sp$^2$ carbon cloth electrode. The new electrode had a 0.5 mg/cm$^2$ Pt loading (2 nm diam particles) with 0.2 cm$^2$ geometric area exposed to the 85% $H_3PO_4$ solution at 170° C. Significant gas evolution (i.e., oxygen evolution) occurred at both electrodes during the electrolysis. The potential of the Pt/diamond composite electrode was stable at ca. 2.52 V vs. the carbon rod counter electrode during the 2 h electrolysis. The potential for the carbon cloth electrode progressively increased from 2.42 to 3.92 V during the first hour of electrolysis. For reference, the equilibrium potential of the carbon rod vs. Ag/AgCl in the electrolysis solution at room temperature was 0.080 V. These two observations reflect the stability of the Pt/diamond composite electrode and the instability of the sp$^2$ carbon cloth electrode, as discussed below. Background cyclic voltametric i-E curves in 0.1 M $HClO_4$ (ultrapure grade, Aldrich Chemical) were recorded for each electrode, before and after the anodic polarization, to check for changes in the catalyst activity. All solutions were prepared with ultrapure water (Barnstead E-Pure, 18 MΩ-cm).

The Pt electrodeposition, anodic polarization, and CV were performed with a CS-2000 digital potentiostat/galvanostat (Cypress Systems Inc., Lawrence, Kans.). A Ag/AgCl (saturated KCl) electrode was used as the reference and a large-area carbon rod served as the counter electrode. The Pt/diamond composite electrodes were pressed against the bottom of the glass cell using an Al plate current collector with the fluid being contained by a Viton O-ring. A small section of the back side of the Si substrate was scratched, cleaned with isopropanol, and coated with Ag paste before making ohmic contact with the Al plate. The exposed geometric area was 0.2 cm$^2$ and all currents are normalized to this area. While mounted in the cell, the composite electrodes were sequentially rinsed with ultrapure water, soaked for 20 min in distilled isopropanol, and then rinsed with ultrapure water. The electrolyte solution was deoxygenated with nitrogen (BOC Gases) for 20 min prior to any of the voltametric measurements. All the voltametric characterizations were done at room temperature (22-24° C.).

Results and Discussion

Figure 3:
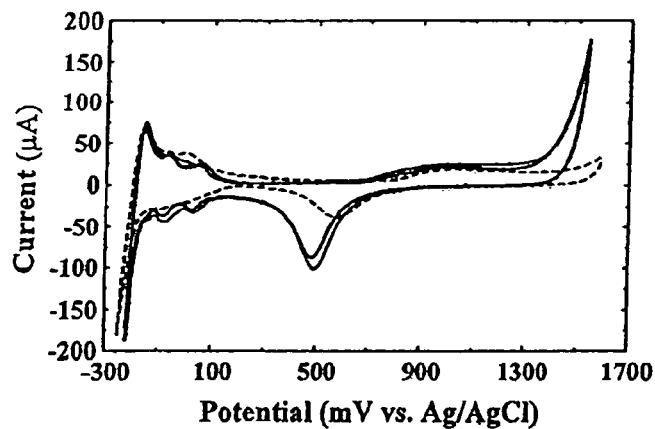
FIG. 3 is a graph showing CV i-E curves for a Pt/diamond composite electrode in 0.1 M $HClO_4$ before (dashed line) and after two 1 h polarizations (solid lines) in 85 wt % $H_3PO_4$ at 170° C., and an anodic current density of 0.1 $A/cm^2$.

FIG. 3 shows CV i-E curves for a Pt/diamond composite electrode in 0.1 M $HClO_4$ before and after two 1 h periods of anodic polarization. As stated above, the polarization was performed in 85% $H_3PO_4$ at 170° C. and a current density of 0.1 A/cm$^2$. The curve for the electrode prior to the polarization (dashed line) reveals the presence of Pt with the expected features; Pt oxide formation, Pt oxide reduction, the adsorption and desorption of underpotential deposited hydrogen and hydrogen evolution. Well-resolved and symmetrical features are observed for hydrogen ion adsorption and desorption between 100 and −100 mV. The current in the Pt oxide formation region, beginning at ca. 700 mV, is flat and featureless indicative of a clean and contaminant-free surface, at least for electroactive contaminants at these potentials. The reduction of Pt oxide occurs at ca. 550 mV. These voltametric features were stable with multiple scans.

After the two 1 h polarizations, the voltametric features are unchanged and clearly reveal that there is no loss of catalyst activity due to degradation of the diamond microstructure and morphology. All the characteristic Pt voltametric features are present. Importantly, there is no loss in the charge associated with hydrogen ion adsorption and desorption. Such loss would be expected if the Pt catalyst particles were detached from the surface due to an oxidizing and corroding diamond support. In fact, the charge associated with the hydrogen ion adsorption actually increased after the electrolysis. The cathodic charge between 100 and −100 mV was 355 µC/cm$^2$ before and increased to 420 and 455 µC/cm$^2$ after the two 1 h polarizations, respectively. The increased charge was attributed to minor surface cleaning and crystallographic changes in the deposits that occur during the vigorous gas evolution.

Figure 4A:
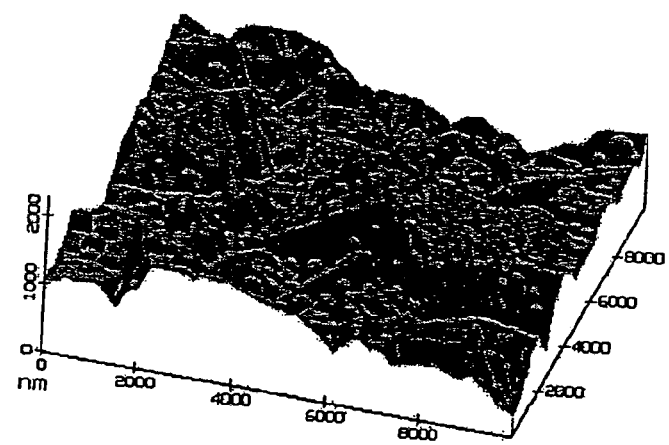
FIGS. 4A and 4B are images (in air) of a Pt/diamond composite electrode (FIG. 4A) before and (FIG. 4B) after anodic polarization in 85 wt % $H_3PO_4$ at 170° C. and an anodic current density of 0.1 $A/cm^2$.
Figure 4B:
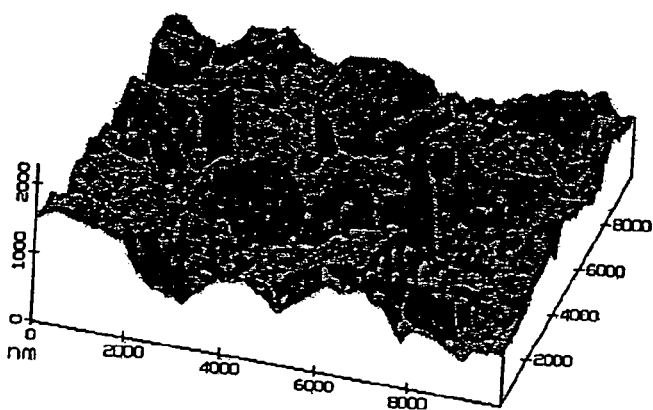

One type of minor cleaning that is possible is the oxidative removal of residual carbon deposits formed during the diamond deposition. These deposits do not affect the stability of the metal particles but, rather, influence their surface activity toward faradaic electron transfer processes. There is no significant change in the particle size and coverage after polarization, at least as revealed by AFM. Some representative images are shown in FIGS. 4A and 4B. The most significant change in the voltammograms is the reduced overpotential for oxygen evolution after the polarizations. The current associated with the reduction of this oxygen is superimposed on the Pt-oxide reduction current at ca. 550 mV, and this causes the current maximum to shift to slightly more negative potentials. There is also a minor decrease in the overpotential for hydrogen evolution after the polarization.

FIGS. 4A and 4B show ex situ AFM images of the Pt/diamond composite electrode before and after the two 1 h polarizations. A well-faceted, polycrystalline morphology is observed before and after electrolysis. The crystallites are randomly oriented with spherical Pt dispersions decorating both the facets and grain boundaries. Clearly, there is no evidence of any morphological or microstructural damage, such as film delamination, grain roughening, or pitting. The similarity of the image features before and after polarization is consistent with the CV data.

Raman measurements were also made on the composite electrodes before and after polarization. No significant spectral changes were observed consistent with a stable microstructure and near-surface optical properties. The diamond line position was upshifted from that observed for a piece of high pressure, high temperature diamond by 1 cm$^{-1}$ or less. The line position, line width, line intensity, and photoluminescence background were unchanged after the polarization.

Figure 5A:
FIGS. 5A and 5B are optical micrographs of a commercial $sp^2$ carbon cloth electrode impregnated with Pt (FIG. 5A) before and (FIG. 5B) after a 1 h anodic polarization in 85 wt % $H_3PO_4$ at 170° C. and an anodic current density of 0.1 $A/cm^2$. Images of a treated (left) and untreated electrode (right) are shown in FIG. 5A.
Figure 5B:

Optical micrographs of a Pt-impregnated sp$^2$ carbon cloth electrode after a 1 h polarization are presented in FIGS. 5A and 5B. FIG. 5A shows images of the treated electrode on the left and the untreated electrode on the right. FIG. 5B shows a larger area of the treated electrode. The physical integrity of the electrode was catastrophically damaged due to the oxidation of the carbon support. The physical evidence for major morphological and microstructural damage was loose pieces of the electrode floating in the solution, lost portions of the electrode, especially at the edges due to oxidation and gasification reactions, and lost catalyst activity.

Figure 6:
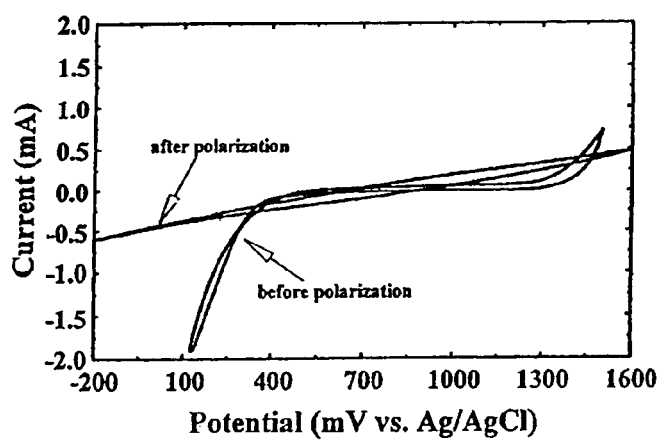
FIG. 6 (prior art) is a graph showing CV i-E curves for the $sp^2$ carbon cloth electrode impregnated with Pt in 0.1 M $HClO_4$ before and after a 1 h polarization in 85 wt % $H_3PO_4$ at 170° C. and an anodic current density of 0.1 $A/cm^2$.

FIG. 6 shows background CV i-E curves for the carbon cloth electrode in 0.1 M HClO$_4$ before and after a 1 h polarization. It was previously reported that diamond electrodes exhibit superior dimensional stability to other sp$^2$ carbon electrodes (e.g., glassy carbon, Grafoil, and highly oriented pyrolytic graphite) during less vigorous electrolysis conditions than those employed herein, for example, in acidic fluoride media (Swain, G. M., *J. Electrochem. Soc.* 141 3382 (1994)). The well-resolved features characteristic of Pt were not observed prior to the polarization even with extensive cycling. However, the characteristic low overpotentials for oxygen and hydrogen evolution are evident as the onset potentials for the anodic and cathodic current are 1300 and 300 mV, respectively. There is little evidence of any catalyst activity after the polarization. The currents for oxygen and hydrogen evolution decrease substantially and the electrode response resembles that expected for a pure resistance. Consistent with this loss of catalytic activity is the observation that the electrode potential progressively increases from 2.5 to 4.0 V during electrolysis. Therefore, it can be concluded that the polarization causes oxidation and corrosion of the carbon support to such an extent that the catalyst is lost and the electrode's electrical resistance is increased.

The above example shows the Pt/diamond composite electrode exhibited superb morphological and microstructural stability during vigorous electrolysis in acidic media at high temperature and current density. There was no degradation of the diamond electrode, nor was there any loss in catalytic activity for hydrogen evolution or oxygen reduction. The Pt catalyst dispersions are physically entrapped within the dimensionally surface microstructure of the diamond lattice and are not detached during the high current density electrolysis in hot phosphoric acid.

This technology allows deposition of the films in an economic and cost effective manner, deposition of the films on higher surface area metal meshes, and by incorporation of other interesting metal catalyst particles, like Pt/Ru alloys.

EXAMPLE 2

The preparation and characterization of an electrically conducting diamond powder formed by coating insulating diamond powder with a boron-doped diamond overlayer. Conductive powders were prepared using deposition times from 1 to 6 h. The surface area of this powder (~2 m$^2$/g) is lower than that desired for an ideal support but, nevertheless, is a useful starting point for making a conductive powder and evaluating its physical, electrical, and electrochemical properties. The powder morphology and microstructure were characterized before and after conductive diamond growth by scanning electron microscopy (SEM) and Raman spectroscopy. X-ray diffraction (XRD) analysis was used to verify the crystallinity of the coated powder. Bulk electrical measurements were performed to determine the ohmic resistance of the packed powder (no binder) Electrodes for electrochemical testing were prepared by mixing the conductive powder with a polytetrafluoroethylene (PTFE) binder, casting a thin layer of the slurry on glass, and curing in an oven. The electrochemical properties of the powder electrode were investigated by cyclic voltammetry using two redox systems: Fe(CN)$_6^{3-/4-}$ and Ru(NH$_3$)$_6^{3+/2+}$. Finally, chronoamperometric measurements were performed in strong acid to evaluate the degradation resistance of the conducting diamond during anodic polarization. Comparison measurements were made with graphite and glassy carbon (GC) powders.

Electrically conducting diamond powder was prepared by coating insulating diamond powder (8-12 μm diam, ~2 m$^2$/g) with a thin boron-doped layer using microwave plasma-assisted chemical vapor deposition. Deposition times from 1 to 6 h were evaluated. Scanning electron microscopy revealed that the diamond powder particles become more faceted and more secondary growths form with increasing deposition time. Fusion of neighboring particles was also observed with increasing growth time. The first-order diamond phonon line appeared in the Raman spectrum at ca. 1331 cm$^{-1}$ for deposition times up to 4 h, and was downshifted to as low as 1317 cm$^{-1}$ for some particles after the 6-h growth. Electrical resistance measurements of the bulk powder (no binder) confirmed that a conductive diamond overlayer formed, as the conductivity increased from near zero (insulating, <10$^{-5}$ S/cm) for the uncoated powder to 1.5 S/cm after the 6-h growth. Ohmic behavior was seen in current-voltage curves recorded for the 4-h powder between ±10 V. Cyclic voltammetric i-E curves for Fe(CN)$_6^{3-/4-}$ and Ru(NH$_3$)$_6^{3+/2+}$ were recorded to evaluate the electrochemical properties of the conductive powder when mixed with a polytetrafluoroethylene binder. At scan rates between 10 and 500 mV/s, $\Delta E_p$ for both redox systems was high ranging from 140 to 350 mV, consistent with significant ohmic resistance within the powder/binder electrode. The resistance is attributed mainly to poor particle-particle connectivity. Anodic polarization at 1.6 V vs. Ag/AgCl for 1 h (25° C.) was performed to evaluate the morphological and microstructural stability of the conductive diamond in comparison with graphite and glassy carbon (GC) powders. The total charge passed during polarization was largest for the GC powder (0.88 C/cm$^2$) and smallest for conductive diamond powder (0.18 C/cm$^2$). SEM images taken of conductive diamond powder after polarization showed-no evidence of microstructural degradation while significant morphological and microstructural changes were seen for the GC powder.

An ideal electrocatalyst support material for a PEMFC would have the following properties: (i) electrical conductivity (>10 S/cm), (ii) high surface area (>10 m$^2$/g), (iii) chemical stability in aqueous environments, (iv) thermal stability up to 200° C., and (v) morphological and microstructural stability at high potentials (e.g., >1 V vs. RHE) and current densities.[8] Boron-doped diamond is an advanced, conductive carbon material that has superb mechanical strength, chemical and thermal stability, and corrosion resistance (Witek, M., et al., *J. Wide Bandgap Mater.*, 8, 171 (2001); Wang, J., et al., *New Diamond Front. Carbon Technol.* 9, 317 (1999); Show, Y., et al., *Chem. Mater.*, 15 879 (2003); and Granger, M. C., et al., *Anal. Chem.* 72, 3793 (2000)). There are technical challenges that must be overcome before electrically conducting diamond can become a viable electrocatalyst support material. Electrically conducting diamond must be prepared in a high surface area form (>10 m$^2$/g).

Boron-doped diamond powder was used in order to address the first technical challenge—the formation of electrically conducting diamond in a high surface area form. High surface area diamond powder (so-called nanodiamond) is produced in large quantities worldwide and is available commercially for approximately $1 to 5/g. This nanodiamond powder is produced during the detonation of explosives and typically has a particle size of ca. 5-10 nm and a specific surface area of 200-600 m$^2$/g (Dolmatov, V. Y., *Russ. Chem. Rev.* 70, 607 (2001)). Unfortunately, for electrochemical applications, this powder is not presently electrically conducting. One possibility for making it electrically conducting is to dope the material during detonation. We are presently pursuing this approach collaboratively with a commercial entity. Diamond powder of lower surface area, with application as an abrasive, is also available commercially. This powder is produced by high pressure, high temperature synthesis and typically has a particle size ranging from ca. 0.1 to 100 μm and a specific surface area less than ca. 5 m$^2$/g. This powder cannot be easily doped during formation but can be made electrically conducting by overcoating with a thin layer of boron-doped diamond using a conventional chemical vapor deposition (CVD) process.

Experimental

Diamond Powder Coating and Characterization. The boron-doped diamond overlayer was grown on insulating diamond powder (8-12 μm diam, GE Micron Products) using microwave plasma-assisted chemical vapor deposition (PACVD, 1.5 kW ASTeX Inc., Lowell, Mass.). The BET surface area of the powder was ~2 m$^2$/g. The powder was prepared for deposition by cleaning in warm aqua regia (30 min) and then in warm 30% hydrogen peroxide (30 min) in order to remove nondiamond sp$^2$ carbon and metallic impurities. The clean powder was then copiously rinsed (ultrapure water, isopropyl alcohol and acetone), filtered, and dried. A portion of the clean powder (ca. 15 mg) was thinly spread over the surface of an undoped Si (100) wafer (Virginia Semiconductor Inc., Fredricksburg, VA.) and placed in the CVD reactor. An ultrahigh purity (99.999%) $CH_4/H_2/B_2H_6$ source gas mixture of 1% $CH_4/H_2$ and 20 ppm $B_2H_6$ was used for the synthesis. The microwave power was 1000 W, the system pressure was 45 Torr, and the total gas flow was 200 sccm. While this approach leads to coating of the powder particles, it is not the most ideal because of the difficulty ensuring uniform plasma/gas contact with the entire particle surface. Additionally, the variable height of the powder particles in the plasma leads to some temperature variation during film growth, and this can cause differences in overlayer thickness and microstructural quality. Particles that experience a higher temperature, for instance, will tend to have a greater nondiamond carbon impurity content.

The coated powder crystallinity and microstructure were evaluated using powder x-ray diffraction analysis (XRD, 1.540 Å, Rikagu Rotaflex RTP300 RC) scanning 2θ from 20 to 100 degrees. The powder morphology was probed by field-emission scanning electron microscopy (SEM, JSM-6300F, JEOL Ltd., Tokyo, Japan, Center for Advanced Microscopy at MSU). A thin layer of gold was deposited on all the powder samples to reduce surface charging effects and to improve the SEM image quality. This was particularly necessary for the insulating powder. The microstructure of the conductive diamond powder was examined by visible-Raman spectroscopy (Raman 2000, Chromex, Inc., Albuquerque, N.Mex.) using a diode-pumped, frequency-doubled CW Nd:YAG laser (500 mW at 532 nm, Coherent), a Chromex 500 is spectrometer (f/4, 600 grooves/mm holographic grating), and a thermo-electrically cooled 1024×256 element charge-coupled device detector (Andor Tech., Ltd.). All spectra were collected at room temperature with a 10 s integration time and an incident power density of ~250 kW/cm$^2$ (100 mW at the sample and a 5 μm diam spot size). The Raman instrument was calibrated using a high-pressure, high-temperature (HPHT), single crystal diamond sample.

Electrical resistance measurements of the coated powder were made by placing a fixed quantity of the powder (ca. 20 mg) between two metal plates and measuring the contact-to-contact resistance with an ohmmeter. The powder resistance was also calculated from I-V curves recorded between ±10 V. The current passing through the powder was measured as a function of the applied dc voltage. The plate-to-plate distance with the powder sample was ca. 2 mm. A 200 g weight was placed on the top metal piece to ensure that a constant force was applied during a measurement. All resistance measurements were made without the use of a binder. The short-circuit resistance between the two plates was always near zero ohms.

Electrode Preparation and Electrochemical Measurements. Conductive diamond, graphite (Superior Graphite Co., Bedford Park, Ill.) or GC powder (SIGRADUR® G, HTW GmBH, Germany) were thoroughly mixed (10 wt. %) with a polytetrafluoroethylene (PTFE, 60% wt. in $H_2O$, Aldrich) binder and a few mL of distilled isopropyl alcohol (ca. 10 mg carbon powder per electrode). This slurry was then cast on a clean glass slide using a pipette and dried overnight in air. A final cure in an oven (air atmosphere) at 280° C. for 30 min and at 350° C. for 30 min was then applied. This final heat treatment was found to be necessary in order to mechanically strengthen the electrode.

All electrochemical measurements were carried out using a CHI650a computerized potentiostat (CH Instruments Inc., Austin, Tex.). The powder electrodes, mounted on glass slides, were pressed against a Viton® o-ring (diam 0.2 cm) at the bottom of a single compartment glass electrochemical cell (Granger, M. C., et al., *Anal. Chem.* 72, 3793 (2000)). Electrical contact was made to the electrode by pressing copper foil against the surface of the powder outside the o-ring. A commercial Ag/AgCl reference electrode (E°=−45 mV vs. SCE) and a large area graphite rod counter electrode were used for all measurements. All solutions were deoxygenated by purging with $N_2$ for 20 min prior to a measurement and the solution was blanketed with the gas during a measurement. The electrode area in contact with the solution was estimated from the cyclic voltammetric background current according to the equation:

$$A = \frac{i_{ch}}{C_{dl}\nu}$$

where A is the electrode area in cm$^2$, $i_{ch}$ is the anodic current at 800 mV in μA, $C_{dl}$ is the capacitance of the electrode (~5 μF/cm$^2$ for diamond, ~35 μF/cm$^2$ for graphite and GC)[18], and ν is the scan rate in V/s. The measured current was assumed to be all capacitive in nature.

Chemicals. All chemicals were analytical-grade, or better, and used without additional purification. Solutions of 1 mM potassium ferrocyanide (Aldrich) and 1 mM hexaammineruthenium (III) chloride (Aldrich), both in 1 M potassium chloride (Spectrum), and 0.1 M perchloric acid (ultrahigh purity, Aldrich) were prepared daily using ultrapure water (>18 MΩ-cm) from an E-pure water purification system (Barnstead). All glassware was cleaned by washing in an ethanol/KOH bath and an alconox/ultrapure water bath, and rinsing with ultrapure water.

Results and Discussion

Figure 8A:
FIGS. 8A to 8D show SEMs of (8A) bare diamond powder and conductive diamond powder at (8B) 1-h, (8C) 2-h, and (8D) 4-h coating times.
Figure 8B:

Material Characterization and Electrical Measurements. Scanning electron micrographs of the uncoated (acid-washed) and coated powders after deposition times of 1, 2, and 4 h are shown in FIGS. 8A-D. Although it is difficult to distinguish differences in particle size, changes in the powder morphology are apparent with increasing deposition time. The uncoated powder particles in FIG. 8A are irregularly shaped and characterized by jagged edges having little faceting. The particle diameters are in the range of ~8-12 μm. FIG. 8B shows a powder sample after a 1-h deposition. The particle edges become smoother and more well-defined faceting develops. Many of the particle surfaces consist of multiple grooves along the edges of the triangular facets. There are also some pits present on the facet surfaces. These grooves may be sites of preferential nucleation. It is possible that carbon atoms nucleate at these defect sites and growth occurs laterally across the surface. The pits on the facet surface may result from incomplete coalescence of growth layers across the surface, which begin at different nucleation sites.

Figure 8C:
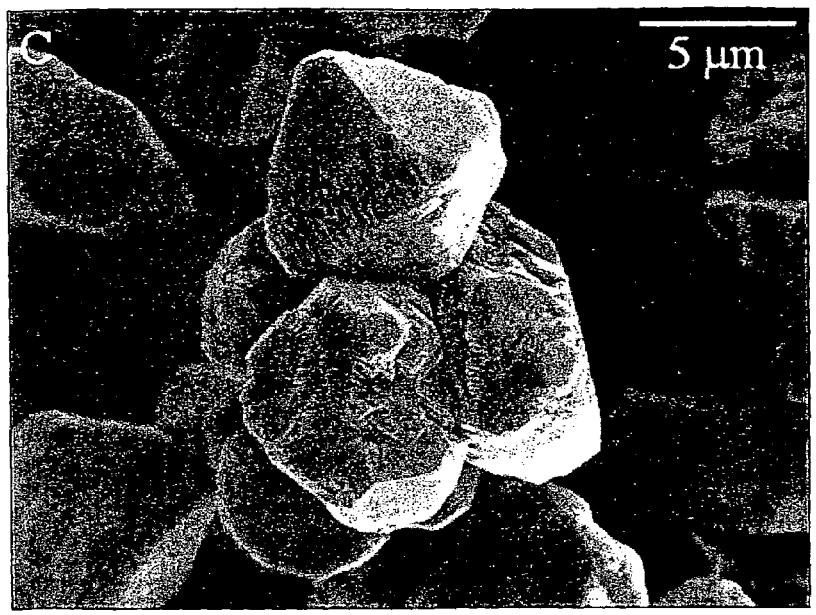
Figure 8D:
Figure 9:
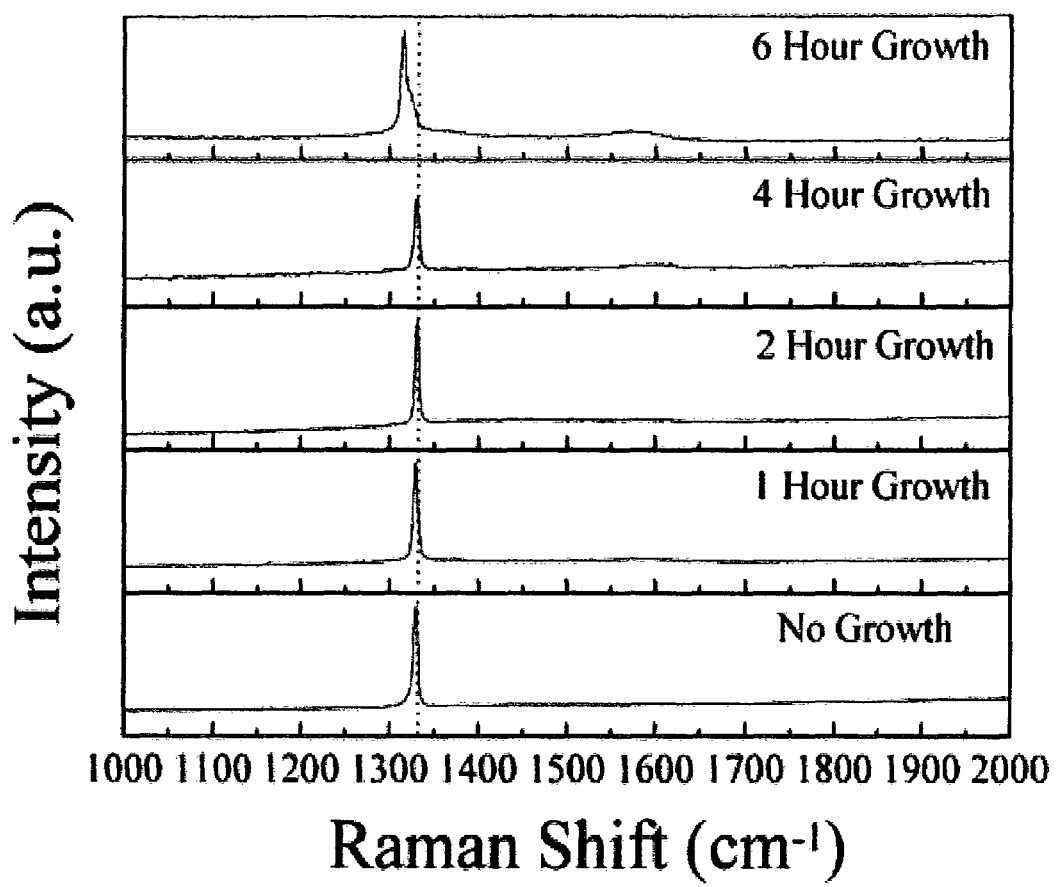
FIG. 9 is a Raman spectra of bare diamond powder and conductive diamond powder after coating times of 1, 2, 4 and 6 h.

The most obvious morphological change after diamond deposition is the fusion of neighboring particles, as indicated by the arrow in FIG. 8B. After the 2-h deposition, neighboring particles continue to fuse together forming clusters of 4 or 5 grains, as seen in FIG. 8C. These clusters become larger with increasing deposition time. Clusters of 8 to 10 particles form after the 4-h deposition and even larger clusters form after the 6-h period. Ideal growth conditions would produce individually coated diamond particles without the loss of surface area that occurs when neighboring particles fuse together. On the other hand, the particle fusion likely imparts a greater degree of mechanical stability and electrical conductivity to the powder. For this deposition method, shorter growth times of 2 or 4 h seem appropriate for forming the conductive diamond overlayer while minimizing the extent of particle fusion.

Raman spectroscopy was used to evaluate the microstructure of the coated diamond powders. FIG. 2 presents Raman spectra for the diamond powders after deposition times of 0 (acid washed powder), 1, 2, 4, and 6 h. The first-order diamond phonon line, expected at 1332 $cm^{-1}$, is present in the spectra for the uncoated and coated powders after the 1-, 2-, and 4-h periods. The line width (FWHM) remains relatively constant at ca. 8 $cm^{-1}$ for all deposition times. To a first approximation, the line width is inversely related to the phonon lifetime and is a measure of the defect density. For comparison, the measured linewidth in the instrument for an HPHT reference diamond sample was 7 $cm^{-1}$. A major change in the Raman spectrum is seen for the 6-h deposition as the first-order diamond phonon line downshifts by an average of ca. 6 $cm^{-1}$. A large deviation in the line position was observed for different powder particles in the same 6-h growth sample. For example, the diamond line position for about half the particles sampled was 1331 $cm^{-1}$, while the peak was downshifted for the other half to as low as 1317 $cm^{-1}$. The diamond line position is known to shift with stress; the degree and direction of which are measures of stress magnitude and type (i.e., tensile or compressive), respectively (Bergman, L., et al., *J. Appl. Phys.* 78 6709 (1995); Mermoux, M., et al., *J. Phys. Chem. B.* 106, 10816 (2002); and Yoshikawa, M., et al., *Appl. Phys. Lett.* 55, 2608 (1989)). It is supposed that the particle fusion in the 6-h growth causes local tensile stress that is reflected in the downshift in the one-phonon line.

In addition to changes in the diamond line position, the spectra also show that the scattering intensity from nondiamond $sp^2$ carbon impurity centered between 1550 and 1580 $cm^{-1}$ increases with deposition time. Some scattering intensity is seen for all the deposition times, but is most intense for the 6-h growth. The nondiamond carbon is not graphitic but probably consists of a mixture of $sp^2/sp^3$-bonded carbon. Raman spectroscopy with visible excitation is quite sensitive to the presence of nondiamond carbon as the scattering cross-section for a model $sp^2$ carbon, graphite, is ca. 50 times larger than the cross-section for diamond (Knight, D.S., et al., *J. Mater. Res.* 4, 385 (1989)). The Raman results indicate that a diamond overlayer grows on the powder and that some nondiamond carbon impurity is incorporated. This impurity likely forms on those powder particles experiencing a higher temperature. The defect density in the diamond overlayer does not appear to be much different from that of the insulating powder as the linewidth is basically unchanged for all the deposition times. Stress is induced into the diamond powder, particularly after the 6-h deposition, and is attributed to particle-particle fusion.

In order to verify that the particles were coated with a conductive overlayer, electrical resistance measurements were made on the packed powder and the data are presented as conductivities in Table 1. Table 1. Bulk electrical conductivity values for graphite and diamond powder before (as-grown) and after (cleaned) washing in (i) warm aqua regia (30 min) and (ii) warm 30% $H_2O_2$ (30 min).

| Sample | Conductance (S/cm) | |
| --- | --- | --- |
| Graphite Powder | 1.3 | |
| Acid Washed Diamond Powder | 0.0 | |
| Conductive Diamond Powder | As-Grown | Cleaned |
| 1-h Growth | 0.027 | $4.0 \times 10^{-5}$ |
| 2-h Growth | 0.015 | 0.010 |
| 4-h Growth | 1.4 | 0.29 |
| 6-h Growth | 1.5 | 0.30 |

These data provide conclusive evidence that the particles are either partially or fully coated with a conducting overlayer and that a high level of connectivity exists when the powder particles are packed together (no binder). Several factors influence the electrical conductivity of the packed powder including (i) the electronic properties of the diamond overlayer (charge carrier concentration and mobility) that are governed primarily by the boron-doping level, (ii) the extent and conformity of the conductive overlayer on each particle, (iii) the particle-particle connectivity, and (iv) the nondiamond carbon impurity on the surface that forms during deposition. As seen in Table 1, the uncoated powder has essentially no conductivity. The conductivity of the powder after a 1-h deposition increases to 0.027 S/cm. As indicated by the Raman data, nondiamond carbon impurity forms during the deposition and will increase the conductivity. In order to assess the contribution of nondiamond carbon, the electrical conductivity of the powders was also measured after acid washing (see experimental section). Acid washing is an effective method for removing to nondiamond carbon impurity from the surface. Table 1 shows that the conductivity of the 1-h powder decreases by 3 orders of magnitude after cleaning. This indicates that the conductivity is largely due to the nondiamond carbon impurity on the surface.

The powder conductivity increases further for the as-grown 4- and 6-h depositions to 1.4 and 1.5 S/cm, respectively. After acid washing, the conductivity of these powders decreases by only a factor of 5-7. Therefore, the conductivity of these powders is primarily due to the boron-doped overlayer, with much less contribution from nondiamond carbon impurity. The data in Table 1 were obtained from a simple resistance measurement using an ohmmeter. However, the conductivity of the 4-h conductive diamond and graphite powders was determined from I-V curves recorded between ±10 V. Ohmic behavior (linear curves) was observed for both powder types over the entire voltage range with linear regression correlation coefficients greater than 0.999. The conductivity was calculated from the slope of the I-V curves and was in agreement with those values measured with the ohmmeter. The results indicate that the boron-doped powder has high electrical conductivity exhibiting ohmic behavior between ±10 V and that good particle-particle contact can be achieved when packed as a dry powder.

Figure 10:
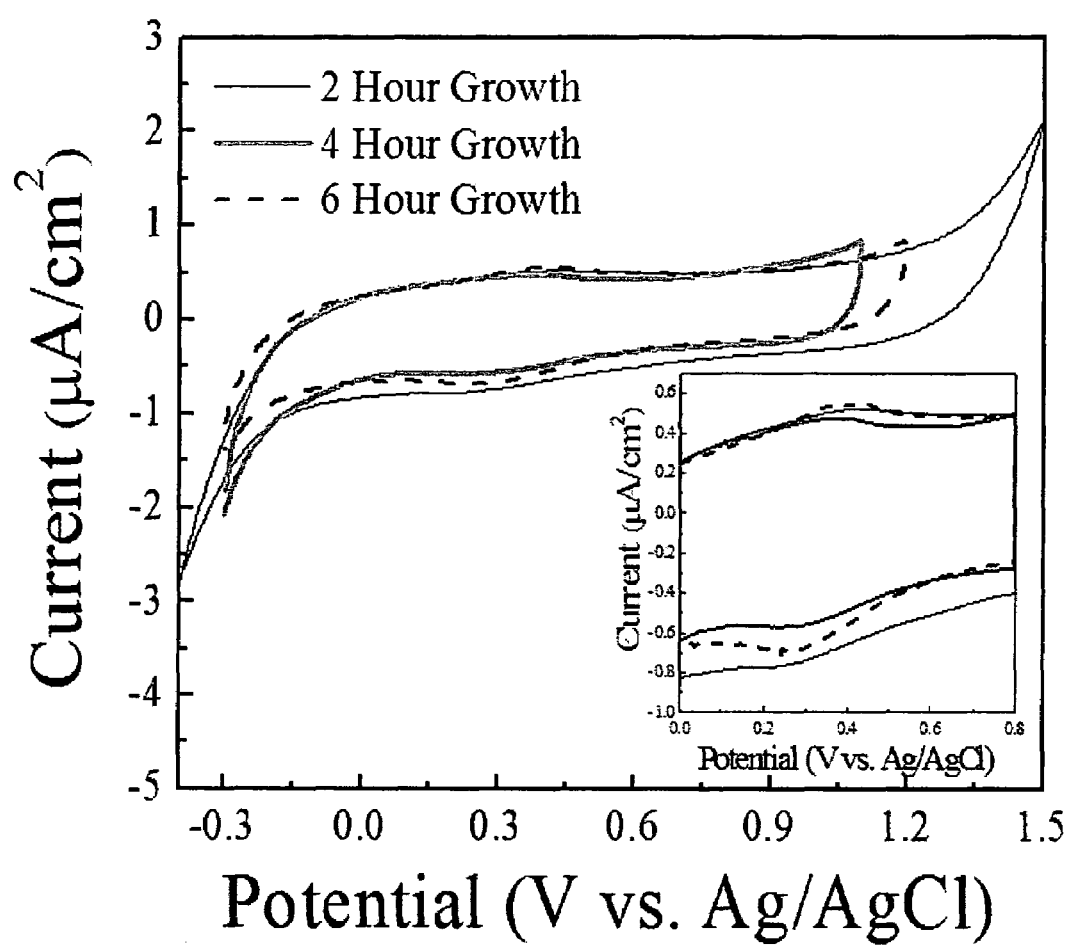
FIG. 10 shows background cyclic voltammetric i-E curves for conductive diamond powder electrodes (2-,4-, and 6-h coating times) in 0.1 M $HClO_4$ at 100 mV/s. Enlarged view of 300 mV region shown in inset.

Electrochemical Characterization. FIG. 10 shows background cyclic voltammetric i-E curves in 0.1 M $HClO_4$ for the diamond powder electrodes bound with PTFE and mounted on glass slides. Curves are shown for powder samples coated with a conductive diamond overlayer for different periods of time. All the powders were as-grown and not cleaned by acid washing prior to the electrochemical measurements. The curve for the uncoated diamond powder (not shown) exhibited zero current at all potentials due to its electrically insulating nature. Several changes in the voltammetric curve shapes can be seen with increasing deposition time. It is important to remember that for sufficient electrical conduction through the powder electrode, the particles must be conformally coated with a highly conductive diamond overlayer and be in good electrical contact with one another. The network of conductive particles must also be in good electrical contact with the current collector (e.g., copper foil). The curves for all the powder electrodes appear relatively flat and featureless within the working potential window for all deposition times. Close inspection of the curve shapes, however, reveals small oxidation and reduction peaks near ~300 mV, as shown in the inset of FIG. 10, particularly for the 4- and 6-h powders. These peaks are commonly seen for $sp^2$ carbon electrodes that have a significant fraction of exposed edge plane (e.g., GC) where redox-active surface carbon-oxygen functionalities can form (e.g., quinones) (Fagan, D. T., et al., *Anal. Chem.* 57 2759 (1985)). Since these peaks are not seen for high quality, hydrogen-terminated diamond thin films, we attribute these peaks to the formation of electroactive carbon-oxygen functional groups at reactive sites on the nondiamond carbon impurity. The largest background current in this region is seen for the 6-h growth. These electrochemical observations are consistent with the Raman data, which reveal detectable levels of nondiamond carbon impurity on the 4- and 6-h powder surface.

In general, the working potential window (potential range between solvent/electrolyte breakdown) for all the growth times is less than what is commonly observed for high-quality diamond thin films (Witek, M., et al., *J. Wide Bandgap Mater.* 8, 171 (2001); Wang, J., et al., *New Diamond Front. Carbon Technol.* 9, 317 (1999); Show, Y., et al., *Chem. Mater.* 15 879 (2003); Granger, M. C., e al., *Anal. Chem.* 72 3793 (2000); and Fischer, A. E., e al, *Anal. Chem.* 76 2553 (2004)). Such diamond thin-film electrodes exhibit a flat and featureless voltammetric response over a potential window greater than 3 V in acidic media. The smaller potential window for these conducting powders is consistent with the presence of nondiamond carbon impurity on the powder surface. A small amount of this impurity is sufficient to cause a reduced potential window, as oxygen and hydrogen evolution are known to occur with lower overpotential on $sp^2$ carbon electrodes, such as GC (Witek, M., et al., *J. Wide Bandgap Mater.* 8 171 (2001)). In fact, research with diamond thin-film electrodes containing differing levels of nondiamond carbon impurity has revealed that as the nondiamond carbon content increases, the working potential window decreases (Bennett, J. A., et al., *J. Electrochem. Soc.* 151 E306 (2004)).

The electrochemical response of the conductive diamond powder was also probed by cyclic voltammetry using $Fe(CN)_6^{3-/4-}$ and $Ru(NH_3)_6^{3+/2+}$. Both of these redox systems are regularly used to study the electrochemical response of a variety of carbon electrodes (Show, Y., et al., *Chem. Mater.* 15, 879 (2003); Granger, M. C., et al., *Anal. Chem.* 72, 3793 (2000); Fischer, A. E., et al., *Anal. Chem.* 76 2553 (2004); Kneten, K. R., et al., *Anal. Chem.* 64 2518 (1992); Rice, R. J., et al., *J. Am. Chem. Soc.* 112 4617 (1989); and Chen, P., et al., *Anal. Chem.* 67 3115 (1995)). The electrode reaction kinetics for these two analytes, and all redox systems for that matter, are sensitive to the density of electronic states in the electrode material near the formal potential of the redox system (i.e., the electrical conductivity). Regardless of the mechanism (i.e., inner- or outer-sphere), high rates of electron-transfer can only occur when the electrode has a sufficient density of states available at the energy (i.e., potential) required to accept electrons from donor states of the analyte or to donate electrons to acceptor states of the analyte (Bard, A. J., et al., *Electrochemical Methods: Fundamentals and Applications*, John Wiley & Sons, Inc., New York (2001)). For metals or semi-metals, such as $sp^2$ carbon and highly-doped diamond thin film, the density of states is high over a wide potential range (Bard, A. J., et al., *Electrochemical Methods: Fundamentals and Applications*, John Wiley & Sons, Inc., New York (2001)). Thus, there is a sufficient number of carriers (i.e., electrons and holes) to support relatively rapid rates of electron-transfer (Bard, A. J., et al., *Electrochemical Methods: Fundamentals and Applications*, John Wiley & Sons, Inc., New York (2001)). However, for semiconductors, a band gap exists such that there are energies at which the density of electronic states can be low (Gerischer, H., *Electrochim. Acta,* 35, 1677 (1990)). If the formal potential of the redox system falls within this range, low rates of electron-transfer will occur (Gerischer, H., *Electrochim. Acta,* 35, 1677 (1990)). Previous work has shown that highly boron-doped diamond thin film possess a high density of electronic states and support relatively rapid electron-transfer rates for $Fe(CN)_6^{3-/4-}$ and $Ru(NH_3)_6^{3+/2+}$ (Show, Y., et al., *Chem. Mater.* 15, 879 (2003); Granger, M. C., et al., *Anal. Chem.* 72, 3793 (2000); Fischer, A. E., et al., *Anal. Chem.* 76 2553 (2004); Hupert, M., et al., *Diamond Relat. Mater.,* 12, 1940 (2003); Granger, M. C., et al., *J. Electrochem. Soc.,* 146, 4551 (1999); Yagi, I., et al., *J. Electroananl. Chem.,* 473, 173 (1999); and Swain, G. M., in *Electroanalytical Chemistry*, A. J. Bard and I. Rubinstein, Editors, Vol. 22, p. 181, Marcel Dekker, Inc., New York (2003)).

Microscopic variables, such as the surface chemistry, can also significantly affect electron-transfer for redox analytes that proceed through an inner-sphere mechanism. It has been shown that $Fe(CN)_6^{3-/4-}$ proceeds through more of an inner-sphere mechanism on boron-doped diamond thin film with the apparent heterogeneous electron-transfer rate constant, $\kappa°_{app}$, being quite sensitive to carbon-oxygen functionalities present on the diamond thin-film surface (Show, Y., et al., Chem. Mater. 15, 879 (2003); Granger, M. C., et al., Anal. Chem. 72, 3793 (2000); Hupert, M., et al., Diamond Relat. Mater., 12, 1940 (2003); Granger, M. C., et al., J. Electrochem. Soc., 146, 4551 (1999); Yagi, I., et al., J. Electroananl. Chem., 473, 173 (1999); and Swain, G. M., in Electroanalytical Chemistry, A. J. Bard and I. Rubinstein, Editors, Vol. 22, p. 181, Marcel Dekker, Inc., New York (2003)). For example, $\kappa°_{app}$ decreases by over 2 orders of magnitude as the percentage of surface carbon-oxygen functionalities increases ((Show, Y., et al., Chem. Mater. 15, 879 (2003); Granger, M. C., et al., Anal. Chem. 72, 3793 (2000); Fischer, A. E., et al., Anal. Chem. 76 2553 (2004); Hupert, M., et al., Diamond Relat. Mater., 12, 1940 (2003); Granger, M. C., et al., J. Electrochem. Soc., 146, 4551 (1999); Yagi, I., et al., J. Electroananl. Chem., 473, 173 (1999); and Swain, G. M., in Electroanalytical Chemistry, A. J. Bard and I. Rubinstein, Editors, Vol. 22, p. 181, Marcel Dekker, Inc., New York (2003)). $Ru(NH_3)_6^{3+/2+}$, on the other hand, proceeds through more of an outer-sphere mechanism on diamond and the electron-transfer kinetics are less sensitive to surface functionalities or microstructure (Show, Y., et al., Chem. Mater. 15, 879 (2003); Granger, M. C., et al., Anal. Chem. 72, 3793 (2000); Hupert, M., et al., Diamond Relat. Mater., 12, 1940 (2003); and Swain, G. M., in Electroanalytical Chemistry, A. J. Bard and I. Rubinstein, Editors, Vol. 22, p. 181, Marcel Dekker, Inc., New York (2003)).

Figure 11A:
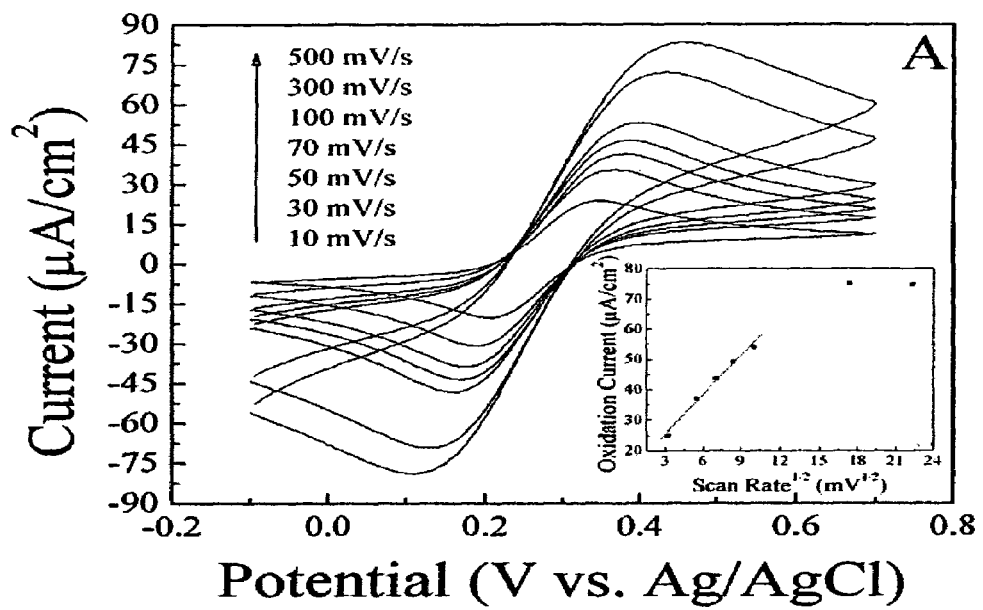
FIGS. 11A and 11B show cyclic voltammetric i-E curves for a conductive diamond powder electrode (4-h coating time) in (11A) 1 mM $Fe(CN)_6^{3-/4-}$ at scan rates between 10 and 500 mV/s and (11B) 1 mM $Ru(NH3)_6^{3+/2+}$ at scan rates between 10 and 300 mV/s.
Figure 11B:
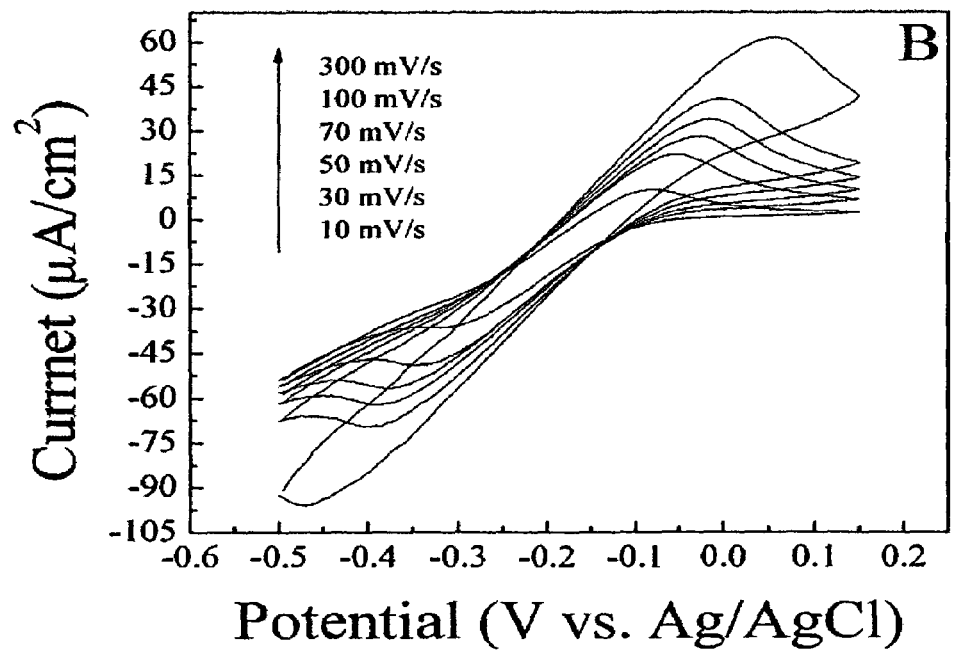

Cyclic voltammetric i-E curves for $Fe(CN)_6^{3-/4-}$ (10 to 500 mV/s) and $Ru(NH_3)_6^{3+/2+}$ (10 to 300 mV/s) for a 4-h as-grown diamond powder electrode are shown in FIG. 11A and 11B, respectively. Well-defined oxidation and reduction peaks are seen for $Fe(CN)_6^{3-/4-}$, although the peak potential separation, $\Delta E_p$, is rather high ranging from 143 mV at 10 mV/s to 348 mV at 500 mV/s. $\Delta E_p$ for glassy carbon and graphite powder electrodes, prepared in a similar manner, ranged from 128 to 213 mV, and 102 to 137 mV, respectively, at the same scan rates. The $\Delta E_p$ values for all the powders are larger than the typical values for this redox system at a diamond film or glassy carbon electrode. For example, $\Delta E_p$ values of ~60-70 mV at 100 mV/s are typical for high quality microcrystalline and nanocrystalline boron-doped diamond thin-film electrodes and freshly polished GC (Granger, M. C., et al., Anal. Chem., 72, 3793 (2000); and Fischer, A. E., et al., Anal. Chem., 76 2553 (2004)). $\Delta E_p$ increases with increasing scan rate for the diamond powder electrode consistent with quasi-reversible electron-transfer kinetics.

The $\Delta E_p$ for $Ru(NH_3)_6^{3+/2+}$ is also relatively high, 220 mV at 10 mV/s. These values were obtained for an electrode used in other electrochemical measurements. It was generally observed that the ohmic resistance within a diamond powder electrode increased with usage, apparently due to lessened connectivity between the powder particles. $\Delta E_p$ values of 112 and 91 mV, respectively, were observed in comparison measurements with new GC and graphite powder electrodes at the same scan rate.

The voltammetric curve shapes can be significantly affected by ohmic resistance either within the solution phase or the electrode. Given the fact that the bulk resistance measurements indicated that a well packed coated diamond powder possesses relatively high electrical conductivity, we suppose the large $\Delta E_p$ values are caused by poor particle-particle connectivity within the electrode. SEM images revealed that the diamond particles are irregularly shaped with sharp edges. This morphology creates challenges in achieving good connectivity when a binder is used. A composite electrode was prepared using 4-h growth conductive diamond powder mixed with 20 wt. % graphite powder to investigate whether the large $\Delta E_p$ was really caused by poor connectivity. The flat, more compressible graphite particles serve to increase the electrical connectivity between the jagged and hard diamond particles. $\Delta E_p$ for $Fe(CN)_6^{3-/4-}$ at the composite electrode was 86 mV at 10 mV/s. While it is possible that an increased rate of electron transfer might be observed at the graphite, $\Delta E_p$ for the composite electrode was lower than that for the graphite powder alone. This suggests that the electron transfer is not occurring exclusively at the graphite powder surfaces and that the presence of the graphite powder increases the connectivity within the diamond electrode, thus decreasing the ohmic resistance. Future work will focus on new approaches to fabricate the powder electrodes that will improve the particle-particle connectivity.

As seen in the inset of FIG. 11A, the faradaic oxidation peak current for $Fe(CN)_6^{3-/4-}$ increases linearly with scan rate$^{1/2}$ ($r^2>0.99$) up to 100 mV/s, indicative of a mass-transport limited response (semi-infinite linear diffusion). However, at scan rates above 100 mV/s, the faradaic current response levels off. Such behavior is not observed for boron-doped diamond thin films deposited in the same manner as the conducting overlayer on the powder. As previously mentioned, for facile electron-transfer, the electrode must possess sufficient density of states near the formal potential of the redox system. If the carrier concentration or mobility is limited then the current response may level off as the potential scan rate or analyte concentration is increased (i.e., as more current is passed). The bulk electrical conductivity measurements showed that when the coated powder particles are well packed, relatively high conductivity is seen. This suggests a highly conducting boron-doped diamond layer is formed over most of the powder particle surfaces and that good particle-particle contact can be established so as to not severely restrict the carrier mobility. For example, in the I-V curve measurements between ±10V, tens to hundreds of mA flowed through the packed powder, much higher currents than during the electrochemical measurement. We suppose the limited faradaic current response for $Fe(CN)_6^{3-/4-}$ at high scan rates is caused by limited carrier mobility within the powder network due to poor particle-particle connectivity. Consistent with this is the observation that the oxidation peak current for $Fe(CN)_6^{-3/-4}$ increased linearly with the scan rate$^{1/2}$ between 10 and 1000 mV/s at the diamond/graphite composite electrode, and did not level off as was the case for the diamond powder electrode.

Morphological and Microstructural Stability. Degradation of sp$^2$ carbon electrocatalyst support materials is a concern in fuel cell research. To serve as a viable alternative to sp$^2$ carbon support materials in fuel cells, diamond powders must be sufficiently conductive, thermally stable, and able to withstand high potentials and current densities (Report of the Basic Energy Sciences Workshop on Hydrogen Production, Storage, and Use, Argonne National Laboratory, Argonne, Ill. (2003)). The superior morphological and microstructural stability of planar boron-doped diamond thin-film electrodes with respect to several sp$^2$ carbon materials, including highly-oriented pyrolytic graphite (HOPG) and GC, is well established (Swain, G. M., J. Electrochem. Soc. 141, 3382 (1994); Cruickshank, B. J., et al., J. Electrochem. Soc., 139 2829 (1992); Bowling, R., et al., Langmuir, 5, 683 (1989); Goss, C. A., et al., Anal. Chem. 65 1378 (1993); and Chen, Q., et al., J. Electrochem. Soc. 144, 3806 (1997)). In addition, the greater stability of Pt/diamond composite electrodes compared to that of an sp$^2$ carbon cloth electrode impregnated with Pt has been demonstrated under conditions similar to those in a phosphoric acid fuel cell (Wang, J., et al., Electrochem. Solid-State Lett., 5, E4 (2002)). In this work, the electrodes were anodically polarized in 85% $H_3PO_4$ at 170° C. and 0.1 A/cm$^2$ for two 1-h periods of time. Severe morphological and microstructural degradation was observed for the $sp^2$ carbon electrode, while no damage or loss of catalyst activity was seen for the Pt/diamond composite electrode (Wang, J., et al., *Electrochem. Solid-State Lett.*, 5, E4 (2002)).

Figure 12:
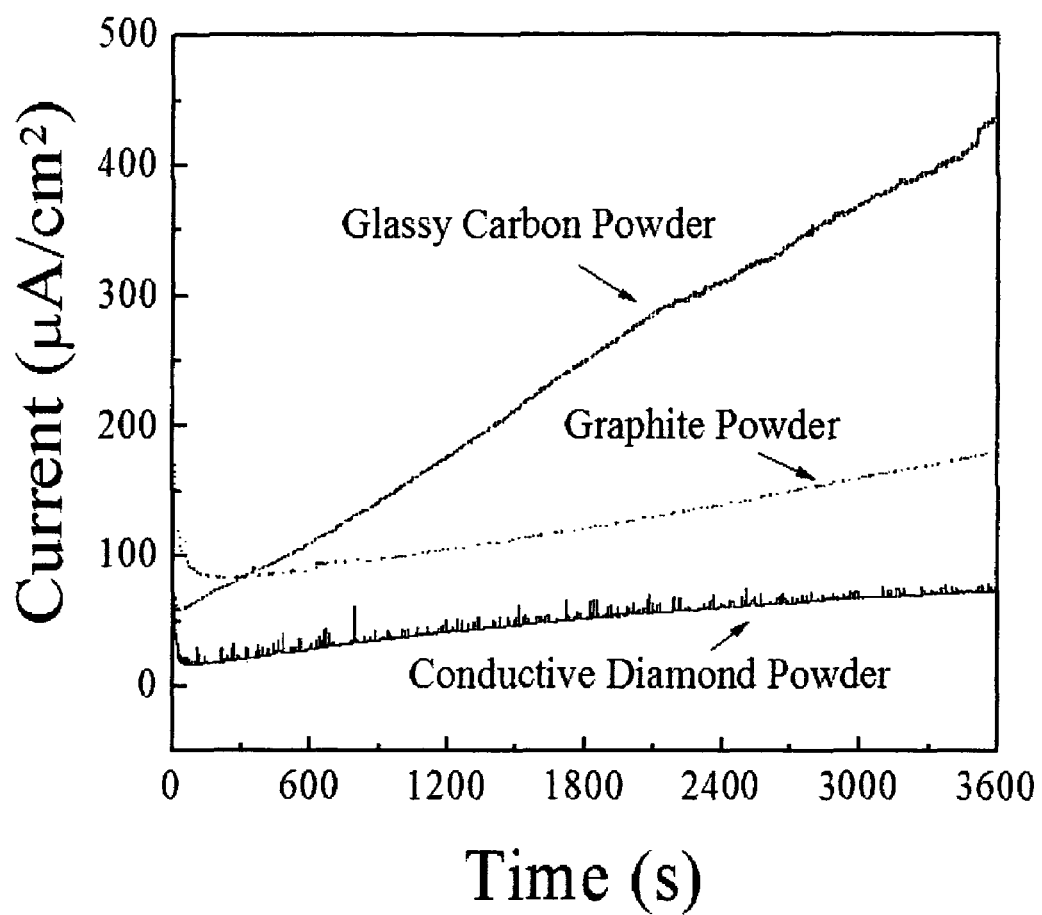
FIG. 12 shows anodic polarization i-t curves for conductive diamond powder, graphite powder, and GC powder electrodes. Polarization was conducted at 1.6 V vs Ag/AgCl and 25° C. for 1 h.

In order to evaluate the morphological and microstructural stability of the conductive diamond powder, the electrodes were anodically polarized at 1.6 V vs. Ag/AgCl and 25° C. for 1 h. Comparison measurements were made with graphite and GC powders. High potentials such as this are possible for short duration in fuel cells during idle operation and can affect the long-term stability and operational lifetime of the device (*Report of the Basic Energy Sciences Workshop on Hydrogen Production, Storage, and Use*, Argonne National Laboratory Argonne, Ill. (2003)). FIG. 12 shows the chronoamperometric i-t curves recorded for each electrode material. The electrode area used to normalize the current was estimated from the anodic background current for each electrode at 800 mV in 0.1 M $HClO_4$ before polarization. The data were not normalized to electrode mass because an accurate measure of the mass of powder actually exposed to solution could not be obtained. As shown in FIG. 12, the total charge passed (i.e., integrated i-t curve) is largest for the GC powder (0.88 $C/cm^2$), followed by graphite (0.45 $C/cm^2$) and the conductive diamond powder (0.18 $C/cm^2$). For GC, the current decreases after the potential step as the electric double layer quickly forms, followed by a progressive increase over time. This is likely caused by microstructural degradation of GC, which leads to a continuously increasing exposed surface area. The i-t curve for the graphite powder follows the same trend, but the current increase is smaller over time. This result is not surprising, considering that the degradation of carbon materials has been shown to be related to the degree of microstructural disorder. More disordered carbon materials have a higher fraction of exposed edge plane, resulting in a higher oxidation/corrosion rate. Clearly, the diamond powder is the least affected by the polarization.

Figure 13A:
FIGS. 13A and 13B are SEMs of a conductive diamond-coated diamond powder electrode (4-h coating time ((13A) before and (13B) after constant potential polarization of 1.6 V vs Ag/AgCl for 1 h in 0.1 M $HClO_4$.
Figure 13B:
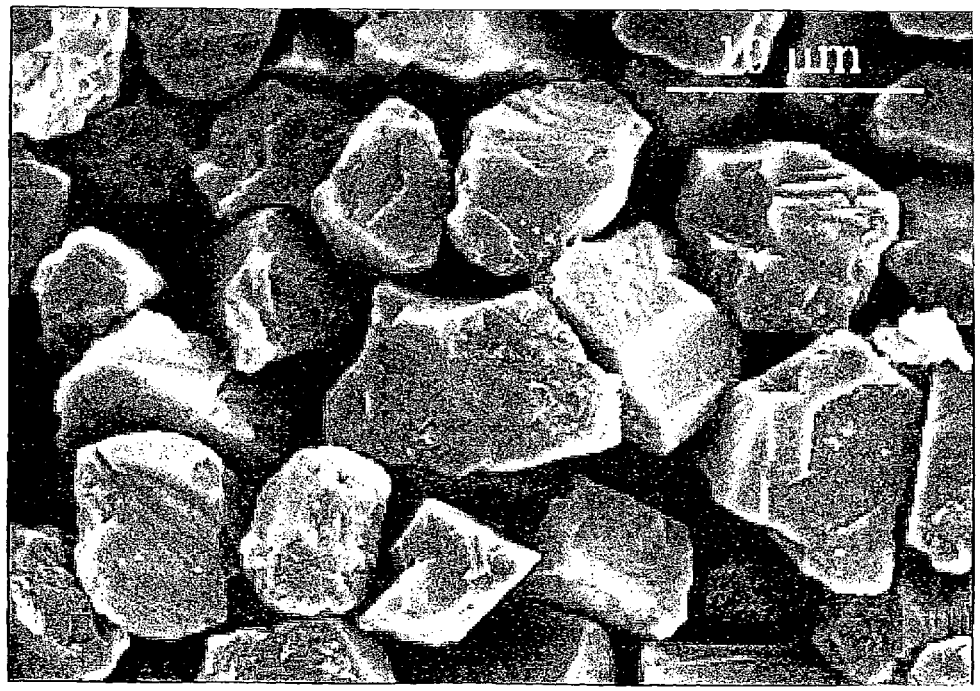
Figure 14A:
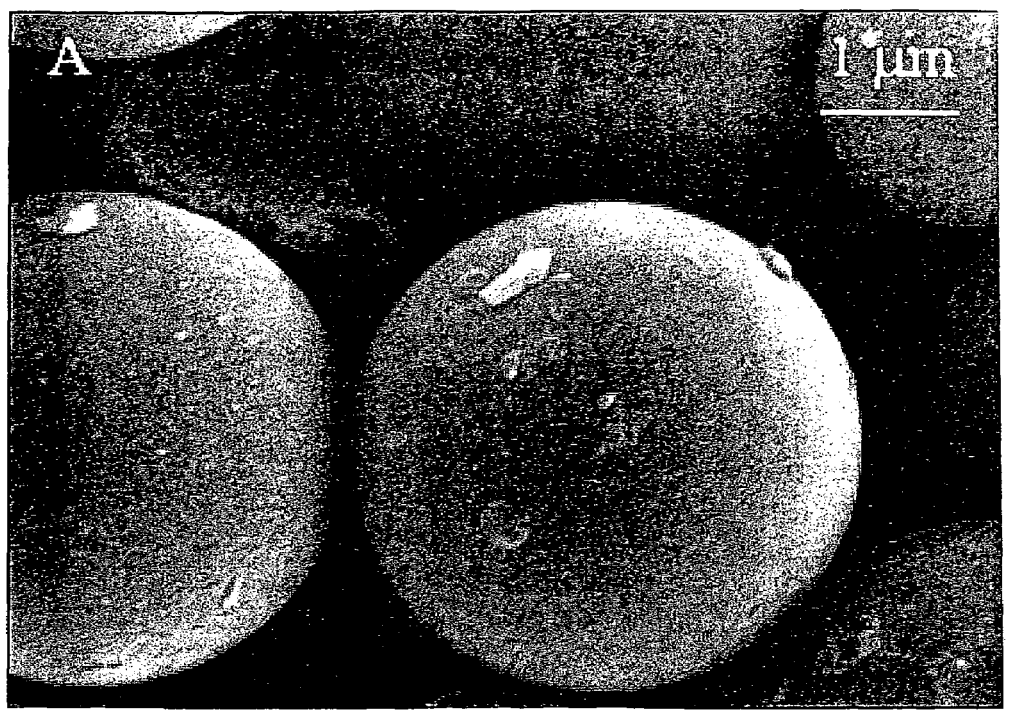
FIGS. 14A and 14B are SEMs of a GC powder electrode (14A) before and (14B) after constant potential polarization of 1.6 V vs Ag/AgCl for 1 h in 0.1 M $HClO_4$.
Figure 14B:
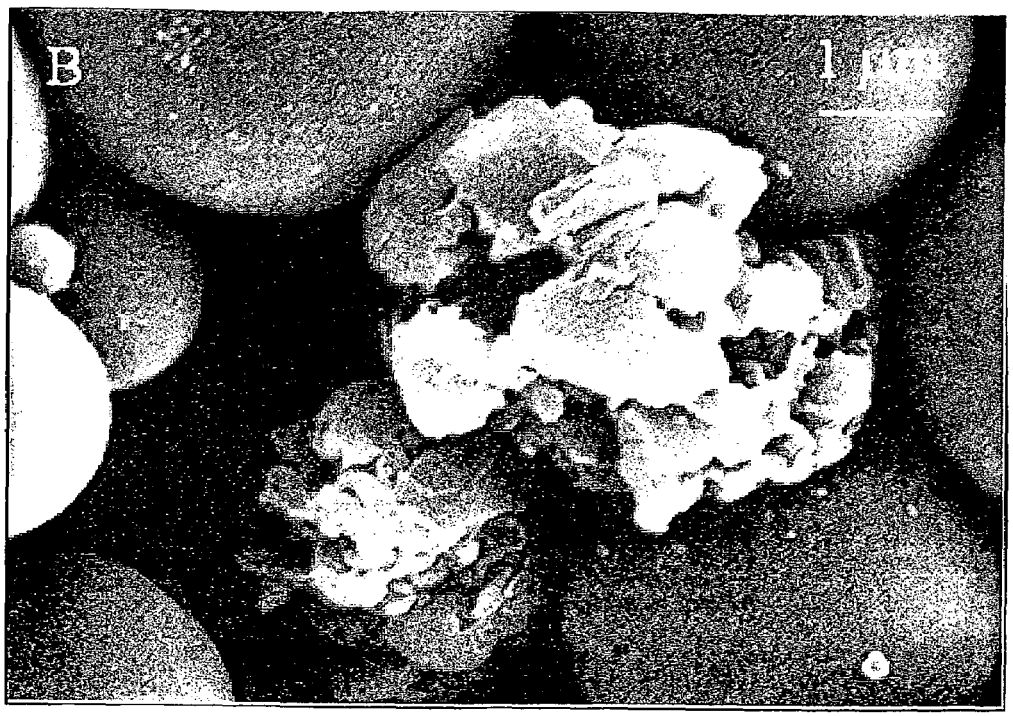

FIG. 13 shows scanning electron micrographs of the conductive diamond powder (13A) before and (13B) after the anodic polarization. Before polarization, the PTFE binder covers some of the particles with a cauliflower-like texture. After polarization, there appears to be much less PTFE covering the grains, although upon close inspection, the polymer still exists between the particles. Magnified images of individual diamond particles showed the same diamond grain morphology and texture before and after anodic polarization. There was no visible morphological or microstructural damage to the conductive diamond powder after polarization under these conditions. Therefore, the increase in the current seen for diamond during polarization was caused by exposure of more electrochemically-active surface area as the PTFE binder delaminated from some of the grains. In contrast, SEM images for GC (A) before and (B) after anodic polarization, shown in FIG. 14, reveal severe morphological and microstructural degradation of some particles. Degradation of this nature in fuel cells would be detrimental to the efficiency of the device because electrocatalyst particles from these areas would be lost. The graphite powder particles are flat, irregularly shaped, and not uniform in size. Therefore, SEM images of graphite powder are not presented because the morphology of the particles was such that the degradation was not easily detected.

CONCLUSIONS

The physical, electrical, and electrochemical properties of a boron-doped diamond powder are described. Our long-term goal is to develop this advanced carbon as a new electrocatalyst support material for possible use in fuel cells. Even though the surface area and electrical conductivity of the powders studied so far are lower than that required for a fuel cell support, this work constitutes a first step toward the making of a viable new support material. The conductive powder was formed by coating a boron-doped overlayer on insulating diamond powder by chemical vapor deposition. SEM, Raman spectroscopy, electrical measurements, and electrochemical tests were used to characterize the material. The results confirm that a boron-doped diamond overlayer was grown on the powder surface with co-deposition of some nondiamond $sp^2$ carbon impurity. Stress was also introduced into the powder, especially at long deposition times (6-h) due to the particle fusion that occurred. Electrical resistance measurements proved that the powders became electrically conducting after being coated with the boron-doped diamond overlayer. The nondiamond carbon impurity was also shown to contribute some to the conductivity, but its effect was much less for the 4- and 6-h deposition times. I-V curves for the packed, dry powder were ohmic between ±10 V. Electrochemical tests revealed the presence of the nondiamond carbon at the surface of the powder and that the powder electrodes (with binder) were responsive to $Fe(CN)_6^{3-/4-}$ and $Ru(NH_3)_6^{3+/2+}$. The cyclic voltammetric curves were, however, distorted by ohmic resistance effects attributed to poor particle-particle connectivity within the binder. Amperometric i-t curves for the polarization of conductive diamond, graphite, and GC powders at 1.6 V vs. Ag/AgCl and 25° C. showed that the lowest anodic charge was passed for diamond. SEM images of the diamond powder before and after polarization showed no evidence of morphological degradation or corrosion. In contrast, significant morphological changes were found for the GC powder. Future work will involve coating diamond powders of higher surface area, developing more effective ways of binding the conducting powder to improve the connectivity, and preparing membrane electrode assemblies with the conducting powder in order to better assess the dimensional stability.

It is intended that the foregoing description be only illustrative of the present invention and that the present invention be limited only by the hereinafter appended claims.

We claim

1. A process for the production of an electrically conductive diamond electrode which comprises:
   (a) coating diamond particles with electrically conductive doped diamond to provide doped diamond particles comprising the diamond particles coated with the electrically conductive doped diamond; and
   (b) binding the doped diamond particles with a binder so that the doped diamond particles are in electrical connection with each other to provide the diamond electrode.

2. The process of claim 1 wherein a portion of the doped diamond particles are exposed on at least one surface of the diamond electrode.

3. The process of claims 1 or 2 wherein individual doped diamond particles are in contact with each other in the binder so as to be conductive.

4. The process of claims 1 or 2 wherein the binder is electrically conductive along with the doped diamond particles.

5. The process of claims 1 or 2 wherein the doped diamond particles are coated with electrocatalytic particles.

6. The process of claims 1 or 2 wherein the doped diamond particles are coated with platinum metal particles.

7. The process of claims 1 or 2 wherein the doped diamond particles are coated with conductive metal particles.

8. The process of claim 7, comprising coating the doped diamond particles with the conductive metal particles by electrodeposition.

9. The process of claims 1 or 2 wherein the electrically conductive doped diamond comprises a boron dopant.

10. The process of claims 1 or 2 wherein the doped diamond particles are coated with conductive metal particles and wherein the doped diamond particles with the conductive metal particles are coated with a film of chemical vapor deposited diamond to secure the conductive metal particles on the doped diamond particles.

11. The process of claim 10 wherein the chemical vapor deposition is accomplished by microwave assisted activation of deposition gases comprising an organic carbon source and hydrogen at reduced pressures.

12. The process of claim 1 wherein the diamond particles to be coated in step (a) comprise individual particles having a particle size ranging from about 0.1 μm to about 100 μm.

13. The process of claim 1 wherein the diamond particles to be coated in step (a) comprise individual particles having a particle size ranging from about 8 μm to about 12 μm.

14. The process of claim 1 wherein the diamond particles to be coated in step (a) have a specific surface area of at least about 2 $m^2/g$.

15. The process of claim 1 wherein the diamond particles to be coated in step (a) have a specific surface area ranging from about 2 $m^2/g$ to about 5 $m^2/g$.

16. The process of claim 1, wherein coating the diamond particles in step (a) comprises performing chemical vapor deposition with sources gases comprising an organic carbon source gas, a hydrogen source gas, and a boron source gas, thereby forming the electrically conductive doped diamond.

17. The process of claim 1, wherein coating the diamond particles in step (a) comprises performing chemical vapor deposition with sources gases comprising an organic carbon source gas, an argon source gas, and a boron source gas, thereby forming the electrically conductive doped diamond.

* * * * *

UNITED STATES PATENT AND TRADEMARK OFFICE
CERTIFICATE OF CORRECTION

PATENT NO. : 7,534,296 B2
APPLICATION NO. : 11/378109
DATED : May 19, 2009
INVENTOR(S) : Greg Swain et al.

It is certified that error appears in the above-identified patent and that said Letters Patent is hereby corrected as shown below:

Column 8, line 44, "HCLO$_4$" should be --HClO$_4$--.

Column 9, line 27, "of 10 S" should be --of 10 s--.

Signed and Sealed this

First Day of September, 2009

David J. Kappos
*Director of the United States Patent and Trademark Office*